United States Patent
Zhang et al.

(10) Patent No.: US 12,134,334 B2
(45) Date of Patent: Nov. 5, 2024

(54) BATTERY SWAPPING CONTROL SYSTEM AND CONTROL METHOD THEREFOR

(71) Applicant: AULTON NEW ENERGY AUTOMOTIVE TECHNOLOGY GROUP, Shanghai (CN)

(72) Inventors: Jianping Zhang, Shanghai (CN); Wencheng Lu, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 957 days.

(21) Appl. No.: 17/261,631

(22) PCT Filed: Jul. 19, 2019

(86) PCT No.: PCT/CN2019/096897
§ 371 (c)(1),
(2) Date: Jan. 20, 2021

(87) PCT Pub. No.: WO2020/015756
PCT Pub. Date: Jan. 23, 2020

(65) Prior Publication Data
US 2021/0268930 A1    Sep. 2, 2021

(30) Foreign Application Priority Data

Jul. 20, 2018  (CN) .......................... 201810805306.2
Jul. 20, 2018  (CN) .......................... 201810805309.6
Jul. 20, 2018  (CN) .......................... 201810805316.6

(51) Int. Cl.
*H02J 7/00*       (2006.01)
*B60L 53/80*    (2019.01)
(Continued)

(52) U.S. Cl.
CPC ............... *B60L 53/80* (2019.02); *B60L 58/12* (2019.02); *G05D 1/0225* (2013.01)

(58) Field of Classification Search
CPC ................................ B60L 53/80; B60L 58/12
(Continued)

(56) References Cited

U.S. PATENT DOCUMENTS 7,999,506 B1 *  8/2011  Hollar .................... B60L 53/34
                                                                320/109
10,279,488 B2 *  5/2019  Li ........................... B25J 5/007
(Continued)

FOREIGN PATENT DOCUMENTS

CN           102673536 A        9/2012
CN           105150820 A        12/2015
(Continued)

OTHER PUBLICATIONS

Oct. 8, 2019 International Search Report issued in International Patent Application No. PCT/CN2019/096897.
(Continued)

*Primary Examiner* — Nathaniel R Pelton

(57) ABSTRACT

Disclosed is a battery swapping control system and a control method therefor. The battery swapping system comprises a control unit and a battery swapping device, wherein the control unit is used for determining a battery model applicable to an electric vehicle, and selecting a first battery placing rack and a second battery placing rack from at least one battery placing rack; and the battery swapping device serves to move to a preset battery swapping position, removes a battery with a power shortage from the electric vehicle, transports the battery with the power shortage to the second placing rack and places it in an unoccupied battery placing compartment, then moves to the first battery placing rack and removes a battery of that battery model, and
(Continued)

transports the battery of that battery model to the preset battery swapping position and installs the battery in the electric vehicle.

17 Claims, 13 Drawing Sheets

(51) Int. Cl.
   *B60L 58/12* (2019.01)
   *G05D 1/00* (2006.01)
(58) Field of Classification Search
   USPC .......................................................... 320/109
   See application file for complete search history.

(56) References Cited

U.S. PATENT DOCUMENTS

| | | | |
|---|---|---|---|
| 10,923,775 B2 * | 2/2021 | Kirk | ................. H01M 10/6571 |
| 2013/0264996 A1 * | 10/2013 | Soong | ................... B60L 53/305 |
| | | | 320/109 |
| 2016/0318487 A1 | 11/2016 | King | |

FOREIGN PATENT DOCUMENTS

| | | | |
|---|---|---|---|
| CN | 105955146 A | | 9/2016 |
| CN | 206900339 | * | 1/2018 |
| CN | 206900339 U | | 1/2018 |
| CN | 107719142 A | | 2/2018 |
| CN | 108173916 A | | 6/2018 |
| CN | 110733375 A | | 1/2020 |
| CN | 110745108 A | | 2/2020 |
| CN | 110803139 A | | 2/2020 |
| EP | 0575864 A2 | | 12/1993 |
| JP | H0648184 A | | 2/1994 |
| KR | 20130118482 A | | 10/2013 |
| WO | 2017119212 A1 | | 7/2017 |

OTHER PUBLICATIONS

Oct. 8, 2019 Written Opinion of the International Searching Authority issued in International Patent Application No. PCT/CN2019/096897.
Aug. 1, 2023 First Notice of Reasons for Refusal issued in Japanese Patent Application No. 2021-503103.
Mar. 22, 2024 First Office Action issued in Korean Patent Application No. KR10-2021-7005126.

* cited by examiner

BATTERY SWAPPING CONTROL SYSTEM AND CONTROL METHOD THEREFOR

This application claims priorities to Chinese Patent Application No. 2018108053166 filed Jul. 20, 2018, Chinese Patent Application No. 2018108053096 filed Jul. 20, 2018, and Chinese Patent Application No. 2018108053062 filed Jul. 20, 2018. All of the aforementioned applications are incorporated herein by reference.

TECHNICAL FIELD

The present disclosure belongs to the battery swapping control field and particularly relates to a system and method for battery swapping control.

BACKGROUND

The present electric vehicle mainly involves two modes for battery swapping, one is a plug-in charging mode, and the other is a quick battery-swap mode with a replaceable battery.

The quick battery-swap mode typically occurs in a battery swapping station. A battery swapping device in the battery swapping station removes an insufficient or depleted battery from a vehicle and places it on a standard charging rack for charging, and then the battery swapping device obtains a new or fully charged battery from the charging rack and installs it into the vehicle. In this case, the battery swapping device needs to move back and forth between the vehicle and the charging rack to remove and install batteries, which is time-consuming and less efficient.

CONTENT OF THE PRESENT DISCLOSURE

The technical problem to be solved in the present disclosure is to overcome the disadvantage in the prior art, which disadvantage is the time consumption and less efficiency of battery swapping caused by using the same battery swapping device for both removing and installing batteries. A system and method for battery swapping control is provided herein.

The present disclosure solves the above-mentioned technical problems through the following technical solutions:

the present disclosure provides a battery swapping control system, comprising: a control unit and a battery swapping device;

the control unit is configured to determine a battery model suitable for an electric vehicle;

the control unit is further configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery with the battery model, and the second condition is set to have an empty battery placing compartment;

the battery swapping device is configured for moving to a predetermined battery swapping position to remove an undercharged battery from the electric vehicle, transfer the undercharged battery to the second battery placing rack, and place it in the empty battery compartment, and then moving to the first battery placing rack to obtain a battery with the battery model from the first battery placing rack, transfer the battery with the battery model to the predetermined battery swapping position, and install it in the electric vehicle, wherein the predetermined battery swapping position refers to a position suitable for the removal and installation of batteries from/into the electric vehicle.

Preferably, the control unit is further configured to monitor the level of batteries placed on the battery placing racks;

the first condition is set to have a fully charged battery with the battery model;

or, the first condition is preferably set to have a fully charged battery with the battery model, and if none of the at least one battery placing rack meet the first condition, the first condition is modified to be having a battery of the battery model with the highest power.

Preferably, the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack, or select one battery placing rack located on a path between the second battery placing rack and the electric vehicle as the first battery placing rack, or select the battery placing rack closest to the electric vehicle or the battery placing rack closest to the vehicle carrying platform as the first battery placing rack, wherein the battery placing rack is located on the path;

and/or, the control unit is further configured to select a battery placing rack randomly as the second placing rack from battery placing racks that meet the second condition when more than one battery placing rack meets the second condition, or select the battery placing rack closest to the electric vehicle or the battery placing rack closest to the vehicle carrying platform as the second battery placing rack.

Preferably, the battery placing racks are disposed on both sides of the vehicle carrying platform along the direction which the electric vehicle is entering.

Preferably, if the at least one battery placing rack comprises a multi-function battery placing rack that meets both the first condition and the second condition, the control unit is further configured to:

use the multi-function battery placing rack as both the first battery placing rack and the second battery placing rack simultaneously.

Preferably, the empty battery compartment is further configured to charge the undercharged battery.

Preferably, the empty battery placing compartment comprises a battery charging circuit;

the battery charging circuit involves constant electrical parameters that match the battery model;

or, the battery charging circuit involves adjustable electrical parameters, and the control unit is further configured to adjust the electrical parameters based on the battery model such that the electrical parameters match the battery model.

Preferably, the control unit is further configured to scan the number plate of the electrical vehicle, and then determine the battery model suitable for the electric vehicle through the number plate.

Preferably, the battery swapping device is controlled by the control unit;

the control unit sends the following instruction to the battery swapping device, and the instruction is executed by the battery swapping device before the electrical vehicle is parked on a vehicle carrying platform:
a parking instruction for commanding the battery swapping device to be parked in a predetermined waiting position in advance.

Preferably, the predetermined waiting position is the same as the predetermined battery swapping position when the predetermined battery swapping position is in parking available condition.

Preferably, the predetermined waiting position refers to a position within a first distance threshold from the predetermined battery swapping position when the predetermined battery swapping position is in parking non-available condition;
the control unit is further configured to send a fine-tuning instruction to the battery swapping device for battery removal after the electric vehicle is parked on the vehicle carrying platform, which the fine-tuning instruction is configured to command the battery swapping device to move to the predetermined battery swapping position from the predetermined waiting position.

Preferably, the predetermined battery swapping position is in parking available condition as all the following conditions are satisfied, otherwise, the predetermined battery swapping position is in parking non-available condition:
the predetermined battery swapping position is an empty space;
existing an access for the battery swapping device to move to the predetermined battery swapping position;
it is predicted that the battery swapping device does not obstruct an electric vehicle moving to the vehicle carrying platform when the battery swapping device is parked in the predetermined battery swapping position.

Preferably, the predetermined battery swapping position is located below or above the vehicle carrying platform, which the location of the predetermined battery swapping position depends on the structure of the vehicle carrying platform.

Preferably, the battery swapping device is controlled by the control unit;
the control unit is further configured to send the following instructions to the battery swapping device after the electric vehicle is parked on a vehicle carrying platform, and the instructions are executed by the battery swapping device:
a battery removal instruction for commanding the battery swapping device to remove the undercharged battery from the electric vehicle;
a first move instruction for commanding the battery swapping device to move to the second battery placing rack;
a battery placement instruction for commanding the battery swapping device to place the undercharged battery into the empty battery compartment;
a second move instruction for commanding the battery swapping device to move to the first battery placing rack;
a battery obtainment instruction for commanding the battery swapping device to obtain the battery with the battery model from the first battery placing rack;
a third move instruction for commanding the battery swapping device to move to the predetermined battery swapping position;
a battery installation instruction for commanding the battery swapping device to install the battery with the battery model into the electric vehicle.

The present disclosure further provides a battery swapping control system, wherein comprising: a control unit and at least two battery swapping devices;
the control unit is configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery suitable for an electric vehicle, and the second condition is set to have an empty battery placing compartment;
the control unit is further configured to configure at least one battery swapping device of the at least two battery swapping devices as a battery swapping device for battery installation, and configure at least one battery swapping device of the at least two battery swapping devices as a battery swapping device for battery removal;
the battery swapping device for battery installation is configured to transfer a battery to be installed, which the battery is obtained from the first battery placing rack and suitable for the electric vehicle, and will be installed into the electric vehicle;
the battery swapping device for battery removal is configured to transfer an undercharged battery, which is a battery that removed from the electric vehicle and will be placed in the empty battery compartment.

Preferably, the control unit is further configured to monitor the level of batteries placed on the battery placing rack;
the first condition is set to have a fully charged battery suitable for the electric vehicle;
or, the first condition is preferably set to have a fully charged battery suitable for the electric vehicle, and if the at least one battery placing rack does not involve a battery rack that meets the first condition, the first condition is modified to be having a battery suitable for the electric vehicle with the highest power.

Preferably, the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack;
and/or, the control unit is further configured to select one battery placing rack randomly as the second placing rack from battery placing racks that meet the second condition when more than one battery placing rack meets the second condition, or select the battery placing rack closest to the electric vehicle or the battery placing rack closest to a vehicle carrying platform for parking the electric vehicle as the second battery placing rack.

Preferably, the battery placing racks are disposed on both sides of the vehicle carrying platform along the direction which the electric vehicle is entering.

Preferably, if the at least one battery placing rack comprises a multi-function battery placing rack that meets both the first condition and the second condition, the control unit is further configured to:

use the multi-function battery placing rack as both the first battery placing rack and the second battery placing rack simultaneously;

or, use the multi-function battery placing rack as any of the first battery placing rack and the second battery placing rack;

or, select any of the following conditions as a necessary condition of using the multi-function battery placing rack as the first battery placing rack:

none of the remaining battery placing racks meet the first condition;

in the remaining battery placing racks, the number of battery placing racks that meet the first condition is less than the number of battery placing racks that meet the second condition;

in the remaining battery placing racks, the number of battery placing racks that meet the first condition is less than the number of battery placing racks that meet the second condition, and the absolute value of the difference value between the two is less than a first difference value threshold;

in the remaining battery placing racks, the number of battery placing racks that meet the first condition is less than a first number threshold;

or, select any of the following conditions as a necessary condition of using the multi-function battery placing rack as the second battery placing rack:

none of the remaining battery placing racks meet the second condition;

in the remaining battery placing racks, the number of battery placing racks that meet the second condition is less than the number of battery placing racks that meet the first condition;

in the remaining battery placing racks, the number of battery placing racks that meet the second condition is less than the number of battery placing racks that meet the first condition, and the absolute value of the difference value between the two is less than a second difference value threshold;

in the remaining battery placing racks, the number of battery placing racks that meet the second condition is less than a second number threshold.

Preferably, the battery placing compartment is further configured to charge batteries.

Preferably, both the at least two battery swapping devices are single-function battery swapping devices;

or, both are multi-function battery swapping devices;

or, some are single-function battery swapping devices, and some are multi-function battery swapping devices;

the single-function battery swapping device comprises a first structure and is only able to be configured as the battery swapping device for battery installation, or comprises a second structure and is only able to be configured as the battery swapping device for battery removal;

the multi-function battery swapping device comprises both the first structure and the second structure, and is able to be configured as any of the battery swapping device for battery installation and the battery swapping device for battery removal.

Preferably, a battery swapping device configured as the battery swapping device for battery installation is the nearest battery swapping device to the first battery placing rack;

or, a battery swapping device configured as the battery swapping device for battery removal is the nearest battery swapping device to the electric vehicle or the nearest battery swapping device to a vehicle carrying platform for parking the electric vehicle;

or, each of the battery placing racks has a predetermined binding relationship with at least one of the battery swapping devices; a battery swapping device configured as the battery swapping device for battery installation is a battery swapping device having a binding relationship with the first battery placing rack or a battery swapping device having a binding relationship with the first battery placing rack and nearest to the first battery placing rack; a battery swapping device configured as the battery swapping device for battery removal is a battery swapping device having a binding relationship with the second battery placing rack or a battery swapping device having a binding relationship with the second battery placing rack and nearest to the electric vehicle or to a vehicle carrying platform for parking the electric vehicle.

Preferably, if the battery model suitable for the electric vehicle is predictable before the electric vehicle is parked on a vehicle carrying platform:

the control unit is further configured to select a battery placing rack that meets the first condition as a first battery placing rack from the at least one battery placing rack before the electric vehicle is parked on the vehicle carrying platform, and then send a battery obtainment instruction to the battery swapping device for battery installation, which the instruction is configured to command the battery swapping device for battery installation to obtain the battery to be installed from the first battery placing rack;

the battery swapping device for battery installation is further configured to execute the battery obtainment instruction;

the control unit is further configured to send a first move instruction to the battery swapping device for battery installation as the battery obtainment instruction has been executed by the battery swapping device for battery installation, wherein the first move instruction is configured to command the battery swapping device for battery installation to be parked in a first predetermined waiting position in advance, which the first predetermined waiting position refers to a position within a first distance threshold from the vehicle carrying platform;

the battery swapping device for battery installation is further configured to execute the first move instruction.

Preferably, the battery model suitable for the electric vehicle is known beforehand in the following way: the vehicle carrying platform is only provided for parking an electric vehicle suitable for the battery of the model.

Preferably, the control unit is further configured to send a second move instruction to the battery swapping device for battery removal before the electric vehicle is parked on a vehicle carrying platform, which the second move instruction is configured to command the battery swapping device for battery removal to be parked in a second predetermined waiting position in advance; the battery swapping device for battery removal is further configured to execute the second move instruction.

Preferably, the second predetermined waiting position is the same as the predetermined battery swapping position when the predetermined battery swapping position is in parking available condition, which the predetermined battery swapping position refers to a position suitable for battery removal from the electric vehicle parked on the vehicle carrying platform.

Preferably, the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;

the control unit is further configured to send a fine-tuning instruction to the battery swapping device for battery removal after the electric vehicle is parked on the vehicle carrying platform, which the fine-tuning instruction is configured to command the battery swapping device for battery removal to move to the predetermined battery swapping position from the second predetermined waiting position.

Preferably, the predetermined battery swapping position is in parking available condition as all the following conditions are satisfied, otherwise, the predetermined battery swapping position is in parking non-available condition:

the predetermined battery swapping position is an empty space;

existing an access for the battery swapping device for battery removal to move to the predetermined battery swapping position;

it is predicted that the battery swapping device for battery removal does not obstruct an electric vehicle moving to the vehicle carrying platform when the battery swapping device for battery removal is parked in the predetermined battery swapping position.

Preferably, the predetermined battery swapping position is located below or above the vehicle carrying platform, which the location of the predetermined battery swapping position depends on the structure of the vehicle carrying platform.

Preferably, the control unit is further configured to send a third move instruction to the battery swapping device for battery removal after the electric vehicle is parked on a vehicle carrying platform, wherein the third move instruction is configured to command the battery swapping device for battery removal to move to and be parked in a predetermined battery swapping position, which the predetermined battery swapping position refers to a position suitable for battery removal from the electric vehicle parked on the vehicle carrying platform; the battery swapping device for battery removal is further configured to execute the third move instruction.

Preferably, the control unit is further configured to send a battery removal instruction to the battery swapping device for battery removal after the electric vehicle is parked on the vehicle carrying platform and the battery swapping device for battery removal is parked in the predetermined battery swapping position, which the battery removal instruction is configured to command the battery swapping device for battery removal to remove the undercharged battery from the electric vehicle;

the battery swapping device for battery removal is further configured to execute the battery removal instruction;

the control unit is further configured to send a fourth move instruction to the battery swapping device for battery removal after the battery removal instruction has been executed by the battery swapping device for battery removal, which the fourth move instruction is configured to command the battery swapping device for battery removal to move to the second battery placing rack, and then place the undercharged battery in the empty battery placing compartment;

the battery swapping device for battery removal is further configured to execute the fourth move instruction.

Preferably, the control unit is further configured to send a fifth move instruction to the battery swapping device for battery installation after the battery swapping device for battery removal leaves the predetermined battery swapping position or leaves a third distance threshold away from the predetermined battery swapping position, which the fifth move instruction is configured to command the battery swapping device for battery installation to move to the predetermined battery swapping position;

the battery swapping device for battery installation is further configured to execute the fifth move instruction;

the control unit is further configured to send a battery installation instruction to the battery swapping device for battery installation after the fifth battery move instruction is executed by the battery swapping device for battery installation, which the battery installation instruction is configured to command the battery swapping device for battery installation to install the battery to be installed into the electric vehicle;

the battery swapping device for battery installation is further configured to execute the battery installation instruction.

The present disclosure further provides a battery swapping control system, comprising: a control unit and at least two battery swapping devices;

the control unit is configured to determine a battery model suitable for an electric vehicle to be battery-swapped;

the control unit is further configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery suitable for an electric vehicle, and the second condition is set to have an empty battery placing compartment;

the control unit is further configured to configure at least one battery swapping device of the at least two battery swapping devices as a battery swapping device for battery installation, and configure at least one battery swapping device of the at least two battery swapping devices as a battery swapping device for battery removal;

the battery swapping device for battery installation is configured to transfer a battery to be installed, which the battery is obtained from the first battery placement and suitable for the electric vehicle, and will be installed into the electric vehicle;

the battery swapping device for battery removal is configured to transfer an undercharged battery, which is a battery that removed from the electric vehicle and will be placed in the empty battery compartment.

Preferably, the control unit is further configured to monitor the level of batteries placed on the battery placing rack;

the first condition is set to have a fully charged battery with the battery model;

or, the first condition is preferably set to have a fully charged battery with the battery model, and if the at least one battery placing rack does not involve a battery rack that meets the first condition, the first condition is modified to be having a battery suitable of the battery model with the highest power.

Preferably, the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack;

and/or, the control unit is further configured to select one battery placing rack randomly as the second placing rack from battery placing racks that meet the second condition when more than one battery placing rack meets the second condition, or select the battery placing rack closest to the electric vehicle or the battery placing rack closest to a vehicle carrying platform for parking the electric vehicle as the second battery placing rack.

Preferably, the battery placing racks are disposed on both sides of the vehicle carrying platform along the direction which the electric vehicle is entering.

Preferably, if the at least one battery placing rack comprises a multi-function battery placing rack that meets both the first condition and the second condition, the control unit is further configured to:

use the multi-function battery placing rack as both the first battery placing rack and the second battery placing rack simultaneously;

or, use the multi-function battery placing rack as any of the first battery placing rack and the second battery placing rack;

or, select any of the following conditions as a necessary condition of using the multi-function battery placing rack as the first battery placing rack:

none of the remaining battery placing racks meet the first condition;

in the remaining battery placing racks, the number of battery placing racks that meet the first condition is less than the number of battery placing racks that meet the second condition;

in the remaining battery placing racks, the number of battery placing racks that meet the first condition is less than the number of battery placing racks that meet the second condition, and the absolute value of the difference value between the two is less than a first difference value threshold;

in the remaining battery placing racks, the number of battery placing racks that meet the first condition is less than a first number threshold;

or, select any of the following conditions as a necessary condition of using the multi-function battery placing rack as the second battery placing rack:

none of the remaining battery placing racks meet the second condition;

in the remaining battery placing racks, the number of battery placing racks that meet the second condition is less than the number of battery placing racks that meet the first condition;

in the remaining battery placing racks, the number of battery placing racks that meet the second condition is less than the number of battery placing racks that meet the first condition, and the absolute value of the difference value between the two is less than a second difference value threshold;

in the remaining battery placing racks, the number of battery placing racks that meet the second condition is less than a second number threshold.

Preferably, the battery placing compartment is further configured to charge batteries.

Preferably, both the at least two battery swapping devices are single-function battery swapping devices;

or, both are multi-function battery swapping devices;

or, some are single-function battery swapping devices, and some are multi-function battery swapping devices;

the single-function battery swapping device comprises a first structure and is only able to be configured as a battery swapping device for battery installation, or comprises a second structure and is only able to be configured as a battery swapping device for battery removal;

the multi-function battery swapping device comprises both the first structure and the second structure, and is able to be configured as any of the battery swapping device for battery installation and the battery swapping device for battery removal.

Preferably, a battery swapping device configured as the battery swapping device for battery installation is the nearest battery swapping device to the first battery placing rack;

or, a battery swapping device configured as the battery swapping device for battery removal is the nearest battery swapping device to the electric vehicle or the nearest battery swapping device to a vehicle carrying platform for parking the electric vehicle;

or, each of the battery placing racks has a predetermined binding relationship with at least one of the battery swapping devices; a battery swapping device configured as the battery swapping device for battery installation is a battery swapping device having a binding relationship with the first battery placing rack or a battery swapping device having a binding relationship with the first battery placing rack and nearest to the first battery placing rack; a battery swapping device configured as the battery swapping device for battery removal is a battery swapping device having a binding relationship with the second battery placing rack or a battery swapping device having a binding relationship with the second battery placing rack and nearest to the electric vehicle or to the vehicle carrying platform for parking the electric vehicle.

Preferably, the control unit is further configured to send a battery obtainment instruction to the battery swapping device for battery installation after the selection of the first battery placing rack, which the battery obtainment instruction is configured to command the battery swapping device for battery installation to obtain the battery to be installed from the first battery placing rack;

the battery swapping device for battery installation is further configured to execute the battery obtainment instruction;

the control unit is further configured to send a first move instruction to the battery swapping device for battery installation after the battery obtainment instruction is executed by the battery swapping device for battery installation, wherein the first move instruction is configured to command the battery swapping device for battery installation to be parked in a first predetermined waiting position in advance, which the first predetermined waiting position refers to a position within a first distance threshold from the vehicle carrying platform;

the battery swapping device for battery installation is further configured to execute the first move instruction.

Preferably, the control unit is further configured to scan the number plate of the electrical vehicle, and then determine a battery model suitable for the electric vehicle through the number plate.

Preferably, the control unit is further configured to send a second move instruction to the battery swapping device for battery removal before the electric vehicle is parked on the vehicle carrying platform, which the second move instruction is configured to command the battery swapping device for battery removal to be parked in a second predetermined waiting position in advance; the battery swapping device for battery removal is further configured to execute the second move instruction.

Preferably, the second predetermined waiting position is the same as the predetermined battery swapping position when the predetermined battery swapping position is in parking available condition, which the predetermined battery swapping position refers to a position suitable for battery removal from the electric vehicle parked on the vehicle carrying platform.

Preferably, the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;

the control unit is further configured to send a fine-tuning instruction to the battery swapping device for battery removal after the electric vehicle is parked on the vehicle carrying platform, which the fine-tuning instruction is configured to command the battery swapping device for battery removal to move to the predetermined battery swapping position from the second predetermined waiting position.

Preferably, the predetermined battery swapping position is in parking available condition as all the following conditions are satisfied, otherwise, the predetermined battery swapping position is in parking non-available condition:

the predetermined battery swapping position is an empty space;

existing an access for the battery swapping device for battery removal to move to the predetermined battery swapping position;

it is predicted that the battery swapping device for battery removal does not obstruct an electric vehicle moving to the vehicle carrying platform when the battery swapping device for battery removal is parked in the predetermined battery swapping position.

Preferably, the predetermined battery swapping position is located below or above the vehicle carrying platform, which the location of the predetermined battery swapping position depends on the structure of the vehicle carrying platform.

Preferably, the control unit is further configured to send a third move instruction to the battery swapping device for battery removal after the electric vehicle is parked on the vehicle carrying platform, wherein the third move instruction is configured to command the battery swapping device for battery removal to move to and be parked in a predetermined battery swapping position, which the predetermined battery swapping position refers to a position suitable for battery removal from the electric vehicle parked on the vehicle carrying platform; the battery swapping device for battery removal is further configured to execute the third move instruction.

Preferably, the control unit is further configured to send a battery removal instruction to the battery swapping device for battery removal after the electric vehicle is parked on the vehicle carrying platform and the battery swapping device for battery removal is parked in the predetermined battery swapping position, which the battery removal instruction is configured to command the battery swapping device for battery removal to remove the undercharged battery from the electric vehicle;

the battery swapping device for battery removal is further configured to execute the battery removal instruction;

the control unit is further configured to send a fourth move instruction to the battery swapping device for battery removal after the battery removal instruction has been executed by the battery swapping device for battery removal, which the fourth move instruction is configured to command the battery swapping device for battery removal to move to the second battery placing rack, and then place the undercharged battery in the empty battery placing compartment;

the battery swapping device for battery removal is further configured to execute the fourth move instruction.

Preferably, the control unit is further configured to send a fifth move instruction to the battery swapping device for battery installation after the battery swapping device for battery removal leaves the predetermined battery swapping position or leaves a third distance threshold away from the predetermined battery swapping position, which the fifth move instruction is configured to command the battery swapping device for battery installation to move to the predetermined battery swapping position;

the battery swapping device for battery installation is further configured to execute the fifth move instruction;

the control unit is further configured to send a battery installation instruction to the battery swapping device for battery installation after the fifth battery move instruction is executed by the battery swapping device for battery installation, which the battery installation instruction is configured to command the battery swapping device for battery installation to install the battery to be installed into the electric vehicle;

the battery swapping device for battery installation is further configured to execute the battery installation instruction.

The present disclosure further provides a battery swapping control method, comprising:

determining a battery model suitable for an electric vehicle;

selecting a battery placing rack that meets a first condition as a first battery placing rack from at least one battery placing rack, which the battery placing racks have several battery placing compartments for battery placement, and the first condition is set to have a battery with the battery model;

selecting a battery placing rack that meets a second condition as a second battery placing rack from the at least one battery placing rack, which the second condition is set to have an empty battery placing compartment;

moving a battery swapping device to a predetermined battery swapping position to remove an undercharged battery from the electric vehicle, transfer the undercharged battery to the second battery placing rack, and place it in the empty battery compartment, the predetermined battery swapping position refers to a position suitable for removing and installing batteries from/in the electric vehicle;

moving the battery swapping device to the first battery placing rack to obtain a battery with the battery model from the first battery placing rack, transfer the battery with the battery model to the predetermined battery swapping position, and install it in the electric vehicle.

Preferably, the battery swapping control method also comprises: monitoring the level of batteries placed on the battery placing racks;
  the first condition is set to have a fully charged battery with the battery model;
  or, the first condition is preferably set to have a fully charged battery with the battery model, and if none of the at least one battery placing rack meet the first condition, the first condition is modified to be having a battery of the battery model with the highest power Preferably, the battery swapping control method also comprises:
  selecting one battery placing rack as the first placing rack from battery placing racks that meet the first condition randomly when more than one battery placing rack meets the first condition, or selecting the battery placing rack closest to the electric vehicle or the battery placing rack closest to a vehicle carrying platform for parking the electric vehicle as the first battery placing rack, or selecting one battery placing rack located on a path between the second battery placing rack and the electric vehicle as the first battery placing rack, or selecting the battery placing rack closest to the electric vehicle or the battery placing rack closest to the vehicle carrying platform as the first battery placing rack, wherein the battery placing rack is located on the path;
  and/or, selecting a battery placing rack as the second placing rack from battery placing racks that meet the second condition randomly when more than one battery placing rack meets the second condition, or selecting the battery placing rack closest to the electric vehicle or the battery placing rack closest to a vehicle carrying platform for parking the electric vehicle as the second battery placing rack Preferably, the battery swapping control method also comprises:
  determining whether the at least one battery placing rack comprises a multi-function battery placing rack that meets both the first condition and the second condition;
  if so:
  using the multi-function battery placing rack as both the first battery placing rack and the second battery placing rack simultaneously.

Preferably, the empty battery placing compartment is further configured to charge the undercharged battery.

Preferably, the empty battery placing compartment comprises a battery charging circuit;
  the battery charging circuit involves constant electrical parameters that match the battery model;
  or, the battery charging circuit involves adjustable electrical parameters, and the battery swapping control method also comprises: adjusting the electrical parameters based on the battery model such that the electrical parameters match the battery model.

Preferably, the determination of a battery model suitable for an electric vehicle to be battery-swapped specifically comprises:
  scanning the number plate of the electrical vehicle, and then determining a battery model suitable for the electric vehicle through the number plate.

Preferably, the battery swapping control method also comprises:
  parking the battery swapping device to be parked in a predetermined waiting position in advance before the electric vehicle is parked on a vehicle carrying platform.

Preferably, the predetermined waiting position is the same as the predetermined battery swapping position when the predetermined battery swapping position is in parking available condition.

Preferably, the predetermined waiting position refers to a position within a first distance threshold from the predetermined battery swapping position when the predetermined battery swapping position is in parking non-available condition;
  the battery swapping control method also comprises:
  parking the battery swapping device to move to the predetermined battery swapping position from the predetermined waiting position after the electric vehicle is parked on the vehicle carrying platform.

Preferably, the predetermined battery swapping position is in parking available condition as all the following conditions are satisfied, otherwise, the predetermined battery swapping position is in parking non-available condition:
  the predetermined battery swapping position is an empty space;
  existing an access for the battery swapping device to move to the predetermined battery swapping position;
  it is predicted that the battery swapping device does not obstruct an electric vehicle moving to the vehicle carrying platform when the battery swapping device is parked in the predetermined battery swapping position Preferably, the predetermined battery swapping position is located below or above the vehicle carrying platform, which the location of the predetermined battery swapping position depends on the structure of the vehicle carrying platform.

The present disclosure further provides a battery swapping control method, comprising:
  selecting a battery placing rack that meets a first condition as a first battery placing rack from at least one battery placing rack, wherein the battery placing racks have several battery placing compartments for battery placement, and the first condition is set to have a battery suitable for an electric vehicle;
  selecting a battery placing rack that meets a second condition as a second battery placing rack from the at least one battery placing rack, which the second condition is set to have an empty battery placing compartment;
  configuring at least one battery swapping device of the at least two battery swapping device as a battery swapping device for battery installation, wherein the battery swapping device for battery installation is configured to transfer a battery to be installed, which is a battery that obtained from the first battery placement, suitable for the electric vehicle and will be installed into the electric vehicle;
  configuring at least one battery swapping device of the at least two battery swapping device as a battery swapping device for battery removal, wherein the battery swapping device for battery removal is configured to transfer an undercharged battery, which is a battery that removed from the electric vehicle and will be placed in the empty battery placing compartment.

Preferably, the battery swapping control method also comprises: monitoring the level of batteries placed on the battery placing racks;

the first condition is set to have a fully charged battery suitable for the electric vehicle;

or, the first condition is preferably set to have a fully charged battery suitable for the electric vehicle, and if none of the at least one battery placing rack meet the first condition, the first condition is modified to be having a battery of the battery model with the highest power.

Preferably, the battery swapping control method also comprises:

selecting one battery placing rack as the first placing rack from battery placing racks that meet the first condition randomly when more than one battery placing rack meets the first condition, or selecting the battery placing rack closest to the electric vehicle or the battery placing rack closest to a vehicle carrying platform for parking the electric vehicle as the first battery placing rack;

and/or, selecting one battery placing rack as the second placing rack from battery placing racks that meet the second condition randomly when more than one battery placing rack meets the second condition, or selecting the battery placing rack closest to the electric vehicle or the battery placing rack closest to a vehicle carrying platform for parking the electric vehicle as the second battery placing rack.

Preferably, the battery swapping control method also comprises:

determining whether the at least one battery placing rack comprises a multi-function battery placing rack that meets both the first condition and the second condition;

if so:

using the multi-function battery placing rack as both the first battery placing rack and the second battery placing rack simultaneously;

or, using the multi-function battery placing rack as any of the first battery placing rack and the second battery placing rack;

or, selecting any of the following conditions as a necessary condition of using the multi-function battery placing rack as the first battery placing rack:

none of the remaining battery placing racks meet the first condition;

in the remaining battery placing racks, the number of battery placing racks that meet the first condition is less than the number of battery placing racks that meet the second condition;

in the remaining battery placing racks, the number of battery placing racks that meet the first condition is less than the number of battery placing racks that meet the second condition, and the absolute value of the difference value between the two is less than a first difference value threshold;

in the remaining battery placing racks, the number of battery placing racks that meet the first condition is less than a first number threshold;

or, selecting any of the following conditions as a necessary condition of using the multi-function battery placing rack as the second battery placing rack:

none of the remaining battery placing racks meet the second condition;

in the remaining battery placing racks, the number of battery placing racks that meet the second condition is less than the number of battery placing racks that meet the first condition;

in the remaining battery placing racks, the number of battery placing racks that meet the second condition is less than the number of battery placing racks that meet the first condition, and the absolute value of the difference value between the two is less than a second difference value threshold;

in the remaining battery placing racks, the number of battery placing racks that meet the second condition is less than a second number threshold.

Preferably, both the at least two battery swapping devices are single-function battery swapping devices;

or, both are multi-function battery swapping devices;

or, some are single-function battery swapping devices, and some are multi-function battery swapping devices;

the single-function battery swapping device comprises a first structure and is only able to be configured as a battery swapping device for battery installation, or comprises a second structure and is only able to be configured as a battery swapping device for battery removal;

the multi-function battery swapping device comprises both the first structure and the second structure, and is able to be configured as any of the battery swapping device for battery installation and the battery swapping device for battery removal Preferably, a battery swapping device configured as the battery swapping device for battery installation is the nearest battery swapping device to the first battery placing rack;

or, a battery swapping device configured as the battery swapping device for battery removal is the nearest battery swapping device to the electric vehicle or the nearest battery swapping device to a vehicle carrying platform for parking the electric vehicle;

or, each of the battery placing racks has a predetermined binding relationship with at least one of the battery swapping devices; a battery swapping device configured as the battery swapping device for battery installation is a battery swapping device having a binding relationship with the first battery placing rack, or a battery swapping device having a binding relationship with the first battery placing rack and nearest to the first battery placing rack; a battery swapping device configured as the battery swapping device for battery removal is a battery swapping device having a binding relationship with the second battery placing rack, or a battery swapping device having a binding relationship with the second battery placing rack and nearest to the electric vehicle or to the vehicle carrying platform for parking the electric vehicle.

Preferably, if the battery model suitable for the electric vehicle is predictable before the electric vehicle is parked on a vehicle carrying platform;

the battery swapping control method also comprises:

selecting a battery placing rack that meets a first condition as a first battery placing rack from the at least one battery placing rack before the electric vehicle is parked on the vehicle carrying platform, and commanding the battery swapping device for battery installation to obtain the battery to be installed from the first battery placing rack;

commanding the battery swapping device for battery installation to be parked in a first predetermined waiting position in advance after the battery swapping device for battery installation obtains the battery to be installed from the first battery placing rack, which the first predetermined waiting position refers to a position within a first distance threshold from the vehicle carrying platform.

Preferably, the battery model suitable for the electric vehicle is known beforehand by the following way: the vehicle carrying platform is only provided for parking an electric vehicle suitable for the battery of the model.

Preferably, the battery swapping control method also comprises:
  commanding the battery swapping device for battery removal to be parked in a second predetermined waiting position in advance before the electric vehicle is parked on a vehicle carrying platform.

Preferably, the second predetermined waiting position is the same as a predetermined battery swapping position when the predetermined battery swapping position is in parking available condition, which the predetermined battery swapping position refers to a position suitable for battery removal from the electric vehicle parked on the vehicle carrying platform.

Preferably, the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;
  the battery swapping control method also comprises:
    commanding the battery swapping device for battery removal to move to the predetermined battery swapping position from the second predetermined waiting position after the electric vehicle is parked on the vehicle carrying platform.

Preferably, the predetermined battery swapping position is in parking available condition as all the following conditions are satisfied, otherwise, the predetermined battery swapping position is in parking non-available condition:
  the predetermined battery swapping position is an empty space;
  existing an access for the battery swapping device for battery removal to move to the predetermined battery swapping position;
  it is predicted that the battery swapping device for battery removal does not obstruct an electric vehicle moving to the vehicle carrying platform when the battery swapping device for battery removal is parked in the predetermined battery swapping position.

Preferably, the predetermined battery swapping position is located below or above the vehicle carrying platform, which the location of the predetermined battery swapping position depends on the structure of the vehicle carrying platform.

Preferably, the battery swapping control method also comprises:
  commanding the battery swapping device for battery removal to move to and be parked in a predetermined battery swapping position after the electric vehicle is parked on a vehicle carrying platform, which the predetermined battery swapping position refers to a position suitable for battery removal from the electric vehicle parked on the vehicle carrying platform.

Preferably, the battery swapping control method also comprises:
  commanding the battery swapping device for battery removal to remove the undercharged battery from the electric vehicle after the electric vehicle is parked on the vehicle carrying platform and the battery swapping device for battery removal is parked in the predetermined battery swapping position;
  commanding the battery swapping device for battery removal to move to the second battery placing rack and then place the undercharged battery in the empty battery placing compartment after the undercharged battery is removed from the electric vehicle by the battery swapping device for battery removal.

Preferably, the battery swapping control method also comprises:
  commanding the battery swapping device for battery installation to move to the predetermined battery swapping position after the battery swapping device for battery removal leaves the predetermined battery swapping position or leaves a third distance threshold away from the predetermined battery swapping position;
  commanding the battery swapping device for battery installation to install the battery to be installed into the electric vehicle after the battery swapping device for battery installation moves to the predetermined battery swapping position.

The above-mentioned preferred conditions may be combined arbitrarily to obtain preferred embodiments of the present disclosure in accordance with common knowledge in the field.

The positive progressive effect of the present disclosure is: through the control for a control unit, two battery swapping devices are used during the whole battery swapping process for a vehicle in the present disclosure:
  battery swapping device for battery installation whose movement track is between the electric vehicle and a first battery placing rack to complete the transport of a battery to be installed;
  battery swapping device for battery removal whose movement track is between the electric vehicle and a second battery placing rack to complete the transport of an undercharged battery.

The two battery swapping devices work with separate responsibilities to accomplish the battery swapping task together, which enables the whole battery swapping time is reduced to be at least half of that only one battery swapping device is used and improves the speed and efficiency of battery swapping, thereby.

The present disclosure further provides a battery swapping control method, comprising:
  determining a battery model suitable for an electric vehicle to be battery-swapped;
  selecting a battery placing rack that meets a first condition as a first battery placing rack from at least one battery placing rack, wherein the battery placing racks have several battery placing compartments for battery placement, and the first condition is set to have a battery with the battery model;
  selecting a battery placing rack that meets a second condition as a second battery placing rack from the at least one battery placing rack, which the second condition is set to have an empty battery placing compartment;
  configuring at least one battery swapping device of the at least two battery swapping device as a battery swapping device for battery installation, wherein the battery swapping device for battery installation is configured to transfer a battery to be installed, which the battery to be installed is a battery obtained from the first battery placing rack with the battery model and will be installed into the electric vehicle;
  configuring at least one battery swapping device of the at least two battery swapping device as a battery swapping device for battery removal, wherein the battery swapping device for battery removal is configured to transfer an undercharged battery, which is a battery that removed from the electric vehicle and will be placed in the empty battery compartment.

Preferably, the battery swapping control method also comprises: monitoring the level of batteries placed on the battery placing racks:
the first condition is set to have a fully charged battery with the battery model;
or, the first condition is preferably set to have a fully charged battery with the battery model, and if none of the at least one battery placing rack meet the first condition, the first condition is modified to be having a battery of the battery model with the highest power.

Preferably, the battery swapping control method also comprises:
randomly selecting one battery placing rack as the first placing rack from battery placing racks that meet the first condition when more than one battery placing rack meets the first condition, or selecting the battery placing rack closest to the electric vehicle or the battery placing rack closest to a vehicle carrying platform for parking the electric vehicle as the first battery placing rack;
and/or, randomly selecting one battery placing rack as the second placing rack from battery placing racks that meet the second condition when more than one battery placing rack meets the second condition, or selecting the battery placing rack closest to the electric vehicle or the battery placing rack closest to a vehicle carrying platform for parking the electric vehicle as the second battery placing rack.

Preferably, the battery swapping control method also comprises:
determining whether the at least one battery placing rack comprises a multi-function battery placing rack that meets both the first condition and the second condition;
if it comprises the multi-function battery placing rack:
using the multi-function battery placing rack as both the first battery placing rack and the second battery placing rack simultaneously;
or, using the multi-function battery placing rack as any of the first battery placing rack and the second battery placing rack;
or, selecting any of the following conditions as a necessary condition of using the multi-function battery placing rack as the first battery placing rack:
none of the remaining battery placing racks meet the first condition;
in the remaining battery placing racks, the number of battery placing racks that meet the first condition is less than the number of battery placing racks that meet the second condition;
in the remaining battery placing racks, the number of battery placing racks that meet the first condition is less than the number of battery placing racks that meet the second condition, and the absolute value of the difference value between the two is less than a first difference value threshold;
in the remaining battery placing racks, the number of battery placing racks that meet the first condition is less than a first number threshold;
or, selecting any of the following conditions as a necessary condition of using the multi-function battery placing rack as the second battery placing rack:
none of the remaining battery placing racks meet the second condition;
in the remaining battery placing racks, the number of battery placing racks that meet the second condition is less than the number of battery placing racks that meet the first condition;
in the remaining battery placing racks, the number of battery placing racks that meet the second condition is less than the number of battery placing racks that meet the first condition, and the absolute value of the difference value between the two is less than a second difference value threshold;
in the remaining battery placing racks, the number of battery placing racks that meet the second condition is less than a second number threshold.

Preferably, both the at least two battery swapping devices are single-function battery swapping devices;
or, both are multi-function battery swapping devices;
or, some are single-function battery swapping devices, and some are multi-function battery swapping devices;
the single-function battery swapping device comprises a first structure and is only able to be configured as a battery swapping device for battery installation, or comprises a second structure and is only able to be configured as a battery swapping device for battery removal;
the multi-function battery swapping device comprises both the first structure and the second structure, and is able to be configured as any of the battery swapping device for battery installation and the battery swapping device for battery removal.

Preferably, a battery swapping device configured as the battery swapping device for battery installation is the nearest battery swapping device to the first battery placing rack;
or, a battery swapping device configured as the battery swapping device for battery removal is the nearest battery swapping device to the electric vehicle or the nearest battery swapping device to a vehicle carrying platform for parking the electric vehicle;
or, each of the battery placing racks has a predetermined binding relationship with at least one of the battery swapping devices; a battery swapping device configured as the battery swapping device for battery installation is a battery swapping device having a binding relationship with the first battery placing rack, or a battery swapping device having a binding relationship with the first battery placing rack and nearest to the first battery placing rack; a battery swapping device configured as the battery swapping device for battery removal is a battery swapping device having a binding relationship with the second battery placing rack, or a battery swapping device having a binding relationship with the second battery placing rack and nearest to the electric vehicle or to the vehicle carrying platform for parking the electric vehicle.

Preferably, the battery swapping control method also comprises:
commanding the battery swapping device for battery installation to obtain the battery to be installed from the first battery placing rack after the selection of the first battery placing rack;
commanding the battery swapping device for battery installation to be parked in a first predetermined waiting position in advance after the battery swapping device for battery installation obtains the battery to be installed from the first battery placing rack, which the first predetermined waiting position refers to a position within a first distance threshold from the vehicle carrying platform.

Preferably, the determination of a battery model suitable for an electric vehicle to be battery-swapped specifically comprises:

scanning the number plate of the electrical vehicle, and then determining a battery model suitable for the electric vehicle through the number plate.

Preferably, the battery swapping control method also comprises:

commanding the battery swapping device to be parked in a second predetermined waiting position in advance before the electric vehicle is parked on the vehicle carrying platform.

Preferably, the second predetermined waiting position is the same as the predetermined battery swapping position when the predetermined battery swapping position is in parking available condition, which the predetermined battery swapping position refers to a position suitable for battery removal from the electric vehicle parked on the vehicle carrying platform.

Preferably, the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;

the battery swapping control method also comprises: commanding the battery swapping device for battery removal to move to the predetermined battery swapping position from the second predetermined waiting position after the electric vehicle is parked on the vehicle carrying platform.

Preferably, the predetermined battery swapping position is in parking available condition as all the following conditions are satisfied, otherwise, the predetermined battery swapping position is in parking non-available condition:

the predetermined battery swapping position is an empty space;

existing an access for the battery swapping device for battery removal to move to the predetermined battery swapping position;

it is predicted that the battery swapping device for battery removal does not obstruct an electric vehicle moving to the vehicle carrying platform when the battery swapping device for battery removal is parked in the predetermined battery swapping position.

Preferably, the predetermined battery swapping position is located below or above the vehicle carrying platform, which the location of the predetermined battery swapping position depends on the structure of the vehicle carrying platform.

Preferably, the control the battery swapping control method also comprises:

commanding the battery swapping device for battery removal to move to and be parked in a predetermined battery swapping position after the electric vehicle is parked on the vehicle carrying platform, which the predetermined battery swapping position refers to a position suitable for battery removal from the electric vehicle parked on the vehicle carrying platform.

Preferably, the battery swapping control method also comprises:

commanding the battery swapping device for battery removal to remove the undercharged battery from the electric vehicle after the electric vehicle is parked on the vehicle carrying platform and the battery swapping device for battery removal is parked in the predetermined battery swapping position;

after the battery removal instruction has been executed by the battery swapping device for battery removal, commanding the battery swapping device for battery removal to move to the second battery placing rack, and then place the undercharged battery in the empty battery placing compartment.

Preferably, the battery swapping control method also comprises:

commanding the battery swapping device for battery installation to move to the predetermined battery swapping position after the battery swapping device for battery removal leaves the predetermined battery swapping position or leaves a third distance threshold away from the predetermined battery swapping position;

commanding the battery swapping device for battery installation to install the battery to be installed into the electric vehicle after the battery swapping device for battery installation moves to the predetermined battery swapping position. The above-mentioned preferred conditions can be combined arbitrarily to obtain preferred embodiments of the present invention on the basis of common knowledge in the art.

The positive and progressive effects of the present disclosure are: the determination of a battery model suitable for the electric vehicle through the control of the control unit is convenient for the selection of the first battery placing rack and the obtaining of the battery to be installed. Moreover, through the control of the control unit, two battery swapping devices are used during the entire process of the battery swapping for a vehicle:

battery swapping device for battery installation whose movement track is between the electric vehicle and a first battery placing rack to complete the transport of a battery to be installed;

battery swapping device for battery removal whose movement track is between the electric vehicle and a second battery placing rack to complete the transport of an undercharged battery.

The two battery swapping devices work with separate responsibilities to accomplish the battery swapping task together, which enables the whole battery swapping time is reduced to be at least half of that only one battery swapping device is used and improves the speed and efficiency of battery swapping, thereby.

The positive and progressive effect of the present disclosure is: the present disclosure could decrease the number of movements, shorten the swapping time and promote the swapping efficiency.

DETAILED DESCRIPTION OF THE PREFERRED EMBODIMENT

The present disclosure is further illustrated below by way of embodiments, but the present disclosure is not limited to the scope of the embodiments.

Embodiment 1

Figure 1:
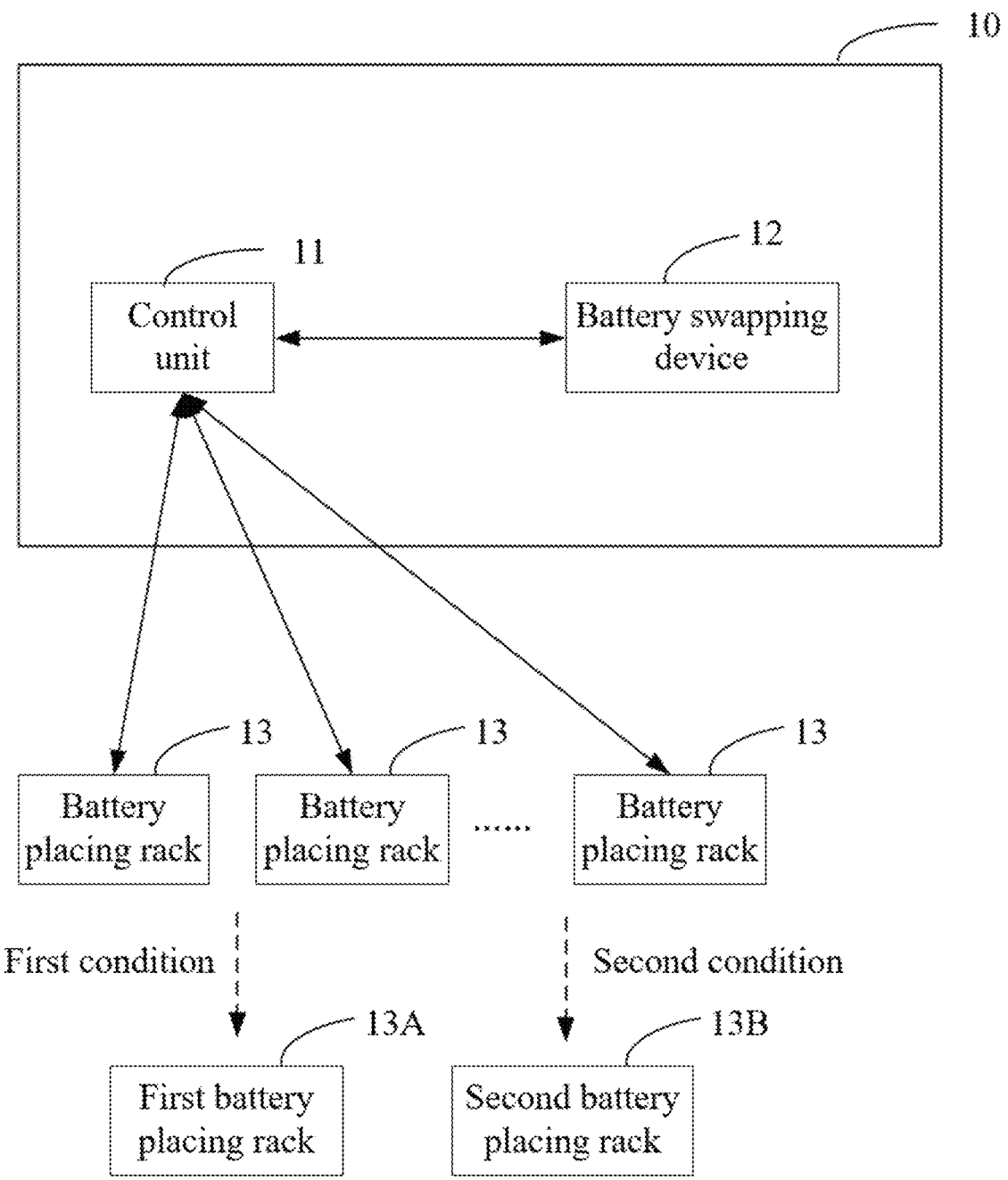
FIG. 1 is a schematic block diagram of a battery swapping control system according to embodiment 1 in the present disclosure.

A battery swapping control system in accordance with this embodiment is shown in FIG. 1. The battery swapping control system 10 comprise: a control unit 11 and a battery swapping device 12, wherein the control unit 11 is in communication with the battery swapping device 12, which the communication connection is preferably a wireless communication connection specifically via means of communication such as 2G, 3G, 4G, Bluetooth and the like. However, it is not excluded that the communication connection may also be a wired connection in certain cases (e.g. the control unit 11 is close to the battery swapping device 12, and the battery swapping device 12 has a very small range of motion).

The control unit 11 is configured to determine a battery model applied for an electric vehicle. Specifically, the control unit 11 may scan the number plate of the electric vehicle, and determine a battery model suitably applied for the electric vehicle through the number plate.

The control unit 11 is further configured to select a battery placing rack that meets a first condition as a first battery placing rack 13A from at least one battery placing rack 13, and select a battery placing rack that meets a second condition as a second battery placing rack 13B from at least one battery placing rack 13, which the battery placing racks have several battery placing compartments for battery placement, the first condition is set to have a battery with the battery model, and the second condition is set to have an empty battery placing compartment.

The battery swapping device 12 is configured for moving to a predetermined battery swapping position to remove an undercharged battery from the electric vehicle, transfer the undercharged battery to the second placing rack 13B, and place it in the empty battery compartment, and then moving to the first battery placing rack 13A to obtain a battery with the battery model from the first battery placing rack 13A, transfer the battery with the battery model to the predetermined battery swapping position, and install it in the electric vehicle, which the predetermined battery swapping position refers to a position suitable for removing and installing batteries from/in the electric vehicle.

In the embodiment, the control unit 11 determines a battery model suitable for an electric vehicle and facilitates the selection of a first battery placing rack; the battery swapping device 12 moves smoothly during the entire battery swapping process of an electric vehicle and facilitates the improvements of the speed and efficiency of the battery swapping.

In the embodiment, the predetermined battery swapping position could be interpreted as the battery is able to be removed or installed from/into an electric vehicle with the minimum action when the battery swapping device 12 is located in the predetermined battery swapping position. The predetermined battery swapping position is located below or above the vehicle carrying platform, which the location of the predetermined battery swapping position can specifically depend on the structure of the vehicle carrying platform.

Figure 2:
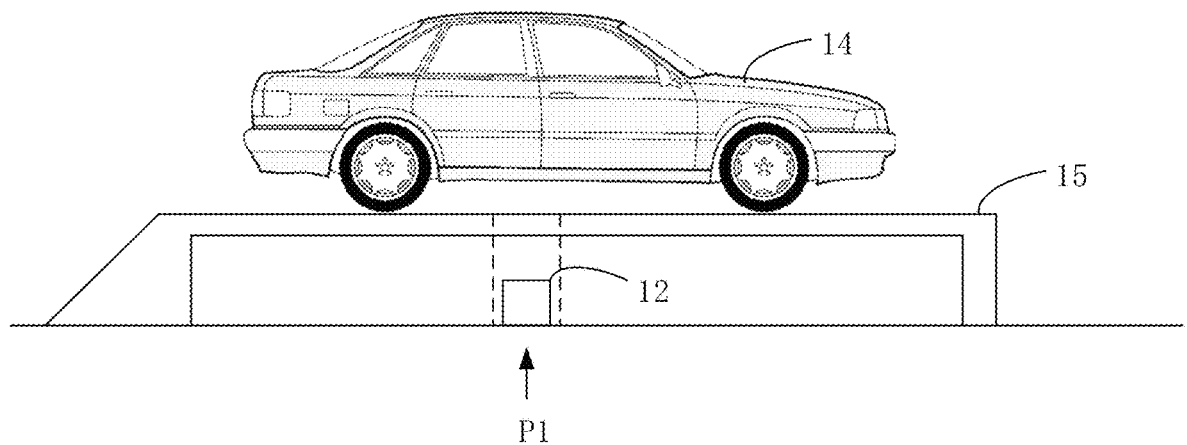
FIG. 2 is a schematic side view of a vehicle carrying platform with a first structure according to embodiment 1 in the present disclosure.

Take the first structure of the vehicle carrying platform as an example. As shown in FIG. 2, the vehicle carrying platform is higher than the ground level and has a hollow area in the middle. An electric vehicle 14 should be parked on the vehicle carrying platform 15 when swapped, and the battery box of the electric vehicle 14 is located above the hollow area. For the vehicle carrying platform 15 with this structure, the predetermined battery swapping position P1 is typically located below the vehicle carrying platform, particularly below the vehicle carrying platform and aligned with the battery box of the electric vehicle 14. For the electric vehicle 14 parked on the vehicle carrying platform 15 for battery swapping, the battery swapping device 12 in the predetermined position P1 only needs to raise a release mechanism for releasing the undercharged battery from the electric vehicle vertically, pass through the hollow area, insert the release mechanism into the gap of the electric vehicle 14 between the external battery box and a battery, and touch the shifting block of the battery box to release the undercharged battery, and then remove the undercharged battery. Similarly, the battery swapping device 12 only needs to raise the battery to be installed into the electric vehicle vertically to complete the installation in the predetermined battery swapping position P1.

Figure 3:
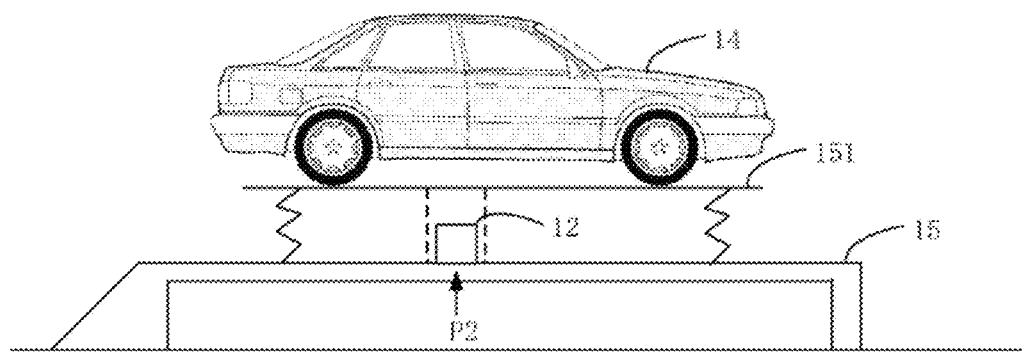
FIG. 3 is a schematic side view of a vehicle carrying platform with a second structure according to embodiment 1 in the present disclosure.

Then take the second structure of the vehicle carrying platform as an example. As shown in FIG. 3, the vehicle carrying platform has a lifting platform 151 in the middle, and a hollow area is provided in the middle of the lifting platform 151. An electric vehicle 14 should be drove onto the vehicle carrying platform 15 and be parked on the lifting platform 151 when swapped, and the battery box of the electric vehicle 14 is located above the hollow area. For the vehicle carrying platform 15 with this structure, the predetermined battery swapping position P2 is typically located above the vehicle carrying platform 15, particularly below the hollow area after the lifting platform 151 is raised. For the electric vehicle 14 parked on the lifting platform 151 for battery swapping, the battery swapping device 12 in the predetermined position P2 only needs to raise a release mechanism for releasing the undercharged battery from the electric vehicle vertically, pass through the hollow area, insert the release mechanism into the gap of the electric vehicle 14 between the external battery box and a battery, and touch the shifting block of the battery box to release the undercharged battery, and then remove the undercharged battery. Similarly, the battery swapping device 12 only needs to raise the battery to be installed into the electric vehicle vertically to complete the installation in the predetermined battery swapping position P2.

Of course, the vehicle carrying platform is not limited to the above structure, but can also be other structures. The predetermined battery swapping position can be set according to the structure of the vehicle carrying platform and further combined with the conditions such as the movement path of the battery swapping device's 12 structure needed to remove the undercharged battery or install the battery.

Embodiment 2

A battery swapping control system in this embodiment involves a further improvement based on embodiment 1 and is mainly reflected in the set of a first condition. As a basis of the selection of the first battery placing rack 13A, the first condition may set other preferred supplementary conditions except for the necessity of having the battery with the battery model. In this embodiment, the supplementary conditions are mainly related to the battery power, and the control unit 11 is further configured to monitoring the level of batteries placed on the battery placing rack.

Specifically, the first condition could be set to have a fully charged battery with the battery model. Correspondingly, the control unit 11 is configured to determine whether the at least one battery placing rack comprises a battery placing rack that meets the first condition, and if so, select one as the first battery placing rack 13A from the at least one battery placing rack. If none of the battery placing racks meets the first condition, the control unit 11 may send out an alarm signal to indicate that the battery swapping of the electric vehicle is unavailable.

Or, in order to promote the probability of being able to swap a battery of the electric vehicle, the first condition may be preferably set to have a fully charged battery with the battery model, and if none of the battery placing racks meets the first condition, the first condition is modified as having a battery of the battery model with the highest power. Similarly, the first condition is set by default to have a fully charged battery with the battery model, and the control unit 11 is configured to determine whether the at least one battery placing rack comprises a battery placing rack that meets the default first condition, and if so, select one as the first battery placing rack 13A from the at least one battery placing rack, if not:

modifying the first condition as having a battery of the battery model with the highest power, and then determining whether the at least one battery placing rack comprises a battery placing rack that meets the current first condition again and if so, select one as the first battery placing rack 13A from the at least one battery placing rack. If there is still no battery placing rack meets the first condition, the control unit 11 may send out an alarm signal to indicate that the battery swapping of the electric vehicle is unavailable.

In addition, the empty battery placing compartment is further configured to charge the undercharged battery in this embodiment. Specifically, the empty battery placing compartment comprises a battery charging circuit, which the battery charging circuit involves constant electrical parameters that match the battery model; or, the battery charging circuit involves adjustable electrical parameters, and the control unit is further configured to adjust the electrical parameters based on the battery model such that the electrical parameters match the battery model. The electrical parameters comprise current, voltage and the like.

Of course, in other embodiments, the first condition may be set to other condition according requirements.

Embodiment 3

A battery swapping control system in this embodiment involves a further improvement based on embodiments 1 or 2 and is mainly reflected in the selections of a first battery placing rack 13A and a second battery placing rack 13B by the control unit 11. Two or more battery placing racks may meet the first condition or second condition when the number of the battery placing rack is two or even more. The control unit 11 may further set the selection requirements of the battery placing rack 13A and the second battery placing rack 13B based on needs.

In this embodiment, in order to deal with the case that two or more battery placing racks meet the first condition, the control unit 11 may be configured to determine whether more than one battery placing rack meets the first condition, and if so:

select one battery placing rack as the first placing rack 13A from battery placing racks that meet the first condition randomly;

or, select the battery placing rack closest to the electric vehicle or the battery placing rack closest to a vehicle carrying platform for parking the electric vehicle as the first battery placing rack 13A from battery placing racks that meet the first condition, such that the move distance and time of the battery swapping device are reduced, and battery swapping efficiency is increased;

or, select one battery placing rack located on a path between the second battery placing rack and the electric vehicle as the first battery placing rack, or select the battery placing rack closest to the electric vehicle or the battery placing rack closest to the vehicle carrying platform as the first battery placing rack, wherein the battery placing rack is located on the path.

Of course, if only one battery placing rack meets the first condition, it is typically only used as the first battery placing rack 13A.

Similarly, in order to deal with the case that two or more battery placing racks meet the second condition, the control unit 11 may be configured to determine whether more than one battery placing rack meets the second condition, and if so:

select one battery placing rack as the second placing rack 13B from battery placing racks that meet the second condition randomly;

or, select the battery placing rack closest to the electric vehicle or the battery placing rack closest to a vehicle carrying platform for parking the electric vehicle as the first battery placing rack 13B from battery placing racks that meet the second condition, such that the move distance and time of the battery swapping device are reduced, and battery swapping efficiency is increased.

Of course, if only one battery placing rack meets the second condition, it is typically only used as the second battery placing rack 13B.

In order to further facilitate the positioning of each battery placing rack, the selection of the first battery placing rack 13A/the second battery placing rack 13B and the reduced move distance of the battery swapping device 12, the battery placing rack may be disposed on both sides of the vehicle carrying platform along the direction which the electric vehicle is entering, wherein the vehicle carrying platform may be a special platform for battery swapping or other common parking-available platforms that are convenient for battery swapping.

The selection of the first battery placing rack 13A and the selection of the second battery placing rack 13B are relatively independent in this embodiment. In other words, the selection requirements of the first battery placing rack 13A and the second battery placing rack 13B may be set respectively based on the various needs.

Embodiment 4

A battery swapping control system in this embodiment involves a further improvement based on embodiments 1 or 2 and is mainly reflected in the selections of a first battery placing rack 13A and a second battery placing rack 13B by the control unit 11. Different from embodiment 3, the association between the first battery placing rack 13A and the second battery placing rack 13B is considered to some extent in this embodiment.

Specifically, the control unit 11 may be configured to determine whether the at least one battery placing rack comprises a multi-function battery placing rack that meets both the first condition and the second condition.

If the at least one battery placing rack does not comprise the multi-function battery placing rack, the first battery placing rack 13A may be select from the battery placing racks that meet the first condition and the second battery placing rack 13B may be select from the battery placing racks that meet the second condition, respectively, in accordance with embodiment 3.

If the at least one battery placing rack comprises the multi-function battery placing rack, the control unit 11 may further be configured to use the multi-function battery placing rack as both the first battery placing rack and the second battery placing rack simultaneously such that the move distance of the battery swapping device 13 is reduced.

Embodiment 5

A battery swapping control system in this embodiment involves a further improvement based on embodiment 1 and is mainly reflected in the control process of the swapping device 12 by the control unit 11. The entire battery swapping process could be divided into the battery-swap preparation process before an electric vehicle is parked on the vehicle carrying platform and the battery-swap operation process after an electric vehicle is parked on the vehicle carrying platform.

The battery swapping device 12 is controlled by the control unit 11.

In the battery-swap preparation process, the control unit 11 sends the following instruction to the battery swapping device 12, and the instruction is executed by the battery swapping device 12:

a parking instruction for commanding the battery swapping device 12 to be parked in a predetermined waiting position in advance. The predetermined waiting position is related to the predetermined battery swapping position and may be the same position as the predetermined battery swapping position or a position near the predetermined battery swapping position.

Specifically, the control unit 11 determines whether the predetermined battery swapping position is in parking-available condition so as to set the predetermined waiting position. The predetermined battery swapping position is in parking available condition as all the following conditions are satisfied, otherwise, the predetermined battery swapping position is in parking non-available condition:

condition (1): the predetermined battery swapping position is an empty space;

condition (2): existing an access for the battery swapping device to move to the predetermined battery swapping position;

condition (3): it is predicted that the battery swapping device does not obstruct an electric vehicle moving to the vehicle carrying platform when the battery swapping device is parked in the predetermined battery swapping position.

Whether condition (3) is met may typically depend on the structure of the vehicle carrying platform.

Take the vehicle carrying platform with the first structure in embodiment 1 as an example. Due to the electric vehicle is parked on the vehicle carrying platform during battery swapping while the predetermined battery position is typically located below the vehicle carrying platform, the battery swapping device 12 does not obstruct an electric vehicle moving to the vehicle carrying platform though the battery swapping device is parked in the predetermined battery swapping position before the electric vehicle moves onto the vehicle carrying platform in the common case. This enable condition (3) is satisfied.

Now take the vehicle carrying platform with second structure in embodiment 1 as an example. Due to the electric vehicle is parked on the vehicle carrying platform during battery swapping while the predetermined battery position typically is also located above the vehicle carrying platform, the battery swapping device 12 may obstruct an electric vehicle moving to the vehicle carrying platform if the battery swapping device is parked in the predetermined battery swapping position before the electric vehicle moves onto the vehicle carrying platform. Therefore, the predetermined battery swapping position does not satisfy condition (3) typically for the second structure of the vehicle carrying platform, and then it is in parking non-available condition.

The predetermined waiting position is the same as the predetermined battery swapping position when the predetermined battery swapping position is in parking available condition. When the predetermined battery swapping position is in parking non-available condition, the predetermined waiting position refers to a position within a second distance threshold from the predetermined battery swapping position, i.e. near the predetermined battery swapping position.

At this point, the battery-swap preparation process is completed. The battery swapping control system waits for the electric vehicle to enter and park onto the vehicle carrying platform to proceed to the battery-swap operation process.

In the battery-swap operation process, the control unit 11 determine whether the predetermined waiting position is the same as the predetermined battery swapping position:

if so, sending a battery removal instruction to the battery swapping device 12, which the battery removal instruction is configured to command the battery swapping device 12 to remove the undercharged battery from the electric vehicle, and the battery swapping device 12 executes the battery removal instruction;

if not, sending a fine-tuning instruction to the battery swapping device, which the fine-tuning instruction is configured to command the battery swapping device to move to the predetermined battery swapping position from the predetermined waiting position to the battery swapping device 12, and the battery swapping device 12 executes the fine-tuning instruction; then, the control unit 11 sends the battery removal instruction to the battery swapping device 12 after the battery swapping device 12 has executed the fine-tuning instruction, and the battery swapping device 12 executes the battery removal instruction.

Next, the control unit 11 sends a first move instruction for commanding the battery swapping device to move to the second battery placing rack to the battery swapping device 12; the battery swapping device 12 executes the first move instruction.

Next, the control unit 11 sends a battery placement instruction for commanding the battery swapping device to place the undercharged battery into the empty battery compartment to the battery swapping device 12; the battery swapping device 12 executes the battery placement instruction.

Next, the control unit 11 sends a second move instruction for commanding the battery swapping device to move to the first battery placing rack to the battery swapping device 12; the battery swapping device 12 executes the second move instruction.

Next, the control unit 11 sends a battery obtainment instruction for commanding the battery swapping device to obtain the battery of the battery model from the first battery placing rack to the battery swapping device 12; the battery swapping device 12 executes the battery obtainment instruction.

Next, the control unit 11 sends a third move instruction for commanding the battery swapping device to move to the predetermined battery swapping position to the battery swapping device 12; the battery swapping device 12 executes the third move instruction.

Next, the control unit 11 sends a battery installation instruction for commanding the battery swapping device to install the battery with the battery model into the electric vehicle to the battery swapping device 12; the battery swapping device 12 executes the battery installation instruction.

At this point, the battery swapping of the electric vehicle is completed, and the control unit 11 command the battery swapping device 12 to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Embodiment 6

Figure 4:
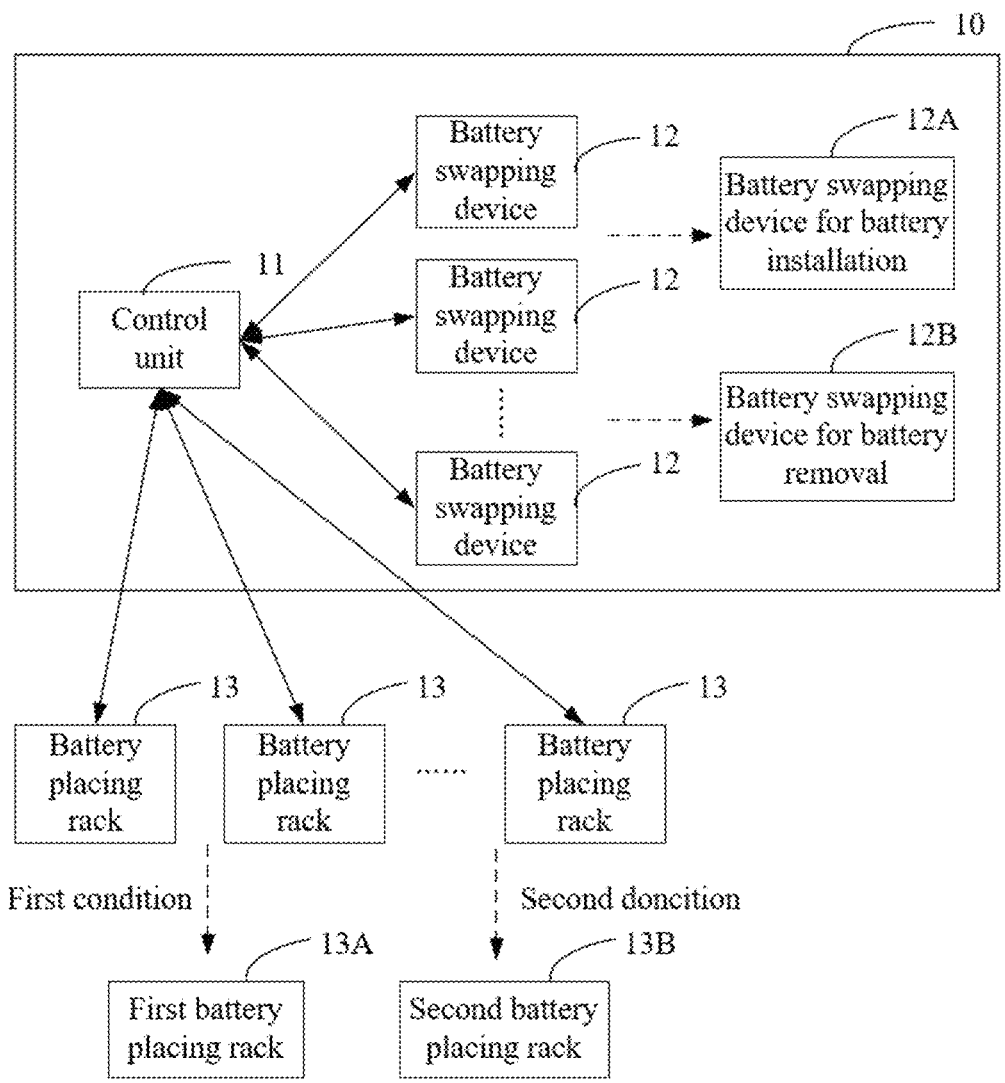
FIG. 4 is a schematic block diagram of a battery swapping control system according to embodiments 2 and 8 in the present disclosure.

A battery swapping control system in accordance with this embodiment is shown in FIG. 4. The system is substantially the same as that in embodiment 1, and the difference is that the system in this embodiment comprises at least two battery swapping devices 12.

The control unit 11 is further configured to configure at least one battery swapping device of the at least two battery swapping devices as a battery swapping device for battery installation 12A. The battery swapping device for battery installation 12A is configured to transfer a battery to be installed, which the battery is a battery with the battery model obtained from the first battery placement 13A, and it will be installed into the electric vehicle.

The control unit 11 is further configured to configure at least one battery swapping device of the at least two battery swapping devices 12 as a battery swapping device for battery removal 12B. The battery swapping device for battery removal 12B is configured to transfer an undercharged battery, which is a battery that removed from the electric vehicle and will be placed in the empty battery compartment.

In this embodiment, The control unit 11 determines the battery model suitable for the electric vehicle, which facilitates to select the first battery placing rack and the battery to be installed; two battery swapping devices 12 are used during the entire process of the battery swapping for a vehicle, which are the battery swapping device for battery installation 12A and the battery swapping device for battery removal 12B. The moving track of the battery swapping device for battery installation 12A is between the first battery placing rack 13A and the electric vehicle to transport the battery to be installed, and the moving track of the battery swapping device for battery removal 12B is between the electric vehicle and the second battery placing rack 13B to transport the undercharged battery. The two battery swapping devices work with separate responsibilities to accomplish the battery swapping task together, which enables the whole battery swapping time is reduced to be at least half of that only one battery swapping device is used and improves the speed and efficiency of battery swapping, thereby.

Embodiment 7

A battery swapping control system in this embodiment involves a further improvement based on embodiment 6. The improvement based on embodiment 6 is substantially the same as the improvement in embodiment 2 based on embodiment 1, and the difference is that the control unit 11 may further monitor the level of each battery in real time, which facilitates the selection of the first battery placing rack 13A.

Embodiment 8

A battery swapping control system in this embodiment involves a further improvement based on embodiments 6 or 7. The improvement based on embodiments 6 or 7 is substantially the same as the improvement in embodiment 3 based on embodiments 1 or 2, and the difference is, in this embodiment, the battery placing rack may be disposed on both sides of the vehicle carrying platform along the direction which the electric vehicle is entering, so as to further facilitate the positioning of each battery placing rack, the selection of the first battery placing rack 13A/the second battery placing rack 13B, and reduce the move distance of the battery swapping device for battery installation 12A/the battery swapping device for battery removal 12B.

Embodiment 9

A battery swapping control system in this embodiment involves a further improvement based on embodiments 6 or 7 and is mainly reflected in the selection of the first battery placing rack 13A and the second battery placing rack 13B by the control unit 11. Different from embodiment 8, when selecting the first battery placing rack 13A and the second battery placing rack 13B, the association of the two is considered to some extent in this embodiment.

Specifically, the control unit 11 may be configured to determine whether the at least one battery placing rack comprises a multi-function battery placing rack that meets both the first condition and the second condition.

If the at least one battery placing rack does not comprise the multi-function battery placing rack, the first battery placing rack 13A may be select from the battery placing racks that meet the first condition and the second battery placing rack 13B may be select from the battery placing racks that meet the second condition, respectively, in accordance with embodiment 8.

If the at least one battery placing rack comprises the multi-function battery placing rack, the control unit 11 may further use the multi-function battery placing rack preferably, and configure the identity of the multi-function battery placing rack by selecting one of the following four ways:

First, use the multi-function battery placing rack as both the first battery placing rack 13A and the second battery placing rack 13B simultaneously.

Second, use the multi-function battery placing rack as any of the first battery placing rack 13A and the second battery placing rack 13B.

Third, in order to maintain the number of the battery placing rack that meets the first condition and the battery placing rack that meets the second condition in balance, select any of the following conditions as a necessary condition of using the multi-function battery placing rack as the first battery placing rack 13A:

condition (1): none of the remaining battery placing racks meet the first condition;

condition (2): in the remaining battery placing racks, the number of battery placing racks that meet the first condition is less than the number of battery placing racks that meet the second condition;

condition (3): in the remaining battery placing racks, the number of battery placing racks that meet the first condition is less than the number of battery placing racks that meet the second condition, and the absolute value of the difference value between the two is less than a first difference value threshold;

condition (4): in the remaining battery placing racks, the number of battery placing racks that meet the first condition is less than a first number threshold.

For the third one, for example: use condition (1) as the necessary condition of using the multi-function battery placing rack as the first battery placing rack 13A, that is, the control unit 11 correspondingly needs to determine whether none of the remaining battery placing racks meet the first condition except the multi-function battery placing rack in the at least one battery placing rack and if so, the multi-function battery placing rack is used as the first battery placing rack 13A.

For other example, use condition (2) as the necessary condition of using the multi-function battery placing rack as the first battery placing rack 13A, that is, the control unit 11 correspondingly needs to determine whether the number of battery placing racks that meet the first condition is less than the number of battery placing racks that meet the second condition in the remaining battery placing racks except the multi-function battery placing rack in the at least one battery placing rack, and if so, the multi-function battery placing rack is used as the first battery placing rack 13A (e.g. 2 battery placing racks meet the first condition, and 3 battery placing racks meet the first condition, the multi-function battery placing rack, therefore, is used as the first battery placing rack 13A).

For another example, use condition (3) as the necessary condition of using the multi-function battery placing rack as the first battery placing rack 13A, that is, the control unit 11 correspondingly needs to determine whether the number of battery placing racks that meet the first condition is less than the number of battery placing racks that meet the second condition in the remaining battery placing racks except the multi-function battery placing rack in the at least one battery placing rack, and the absolute value of the difference value between the two is less than a first difference value threshold, and if so, the multi-function battery placing rack is used as the first battery placing rack 13A (e.g. 2 battery placing racks meet the first condition, 6 battery placing racks meet the first condition, and the first difference value threshold is 3, the multi-function battery placing rack, therefore, is used as the first battery placing rack 13A).

For another example, use condition (4) as the necessary condition of using the multi-function battery placing rack as the first battery placing rack 13A, that is, the control unit 11 correspondingly needs to determine whether the number of battery placing racks that meet the first condition is less than a first number threshold in the remaining battery placing racks except the multi-function battery placing rack in the at least one battery placing rack and if so, the multi-function battery placing rack is used as the first battery placing rack 13A (e.g. 1 battery placing racks meets the first condition, the first difference value threshold is 2, the multi-function battery placing rack, therefore, is used as the first battery placing rack 13A).

Fourth, in order to maintain the number of the battery placing rack that meets the first condition and the battery placing rack that meets the second condition in balance, select any of the following conditions as a necessary condition of using the multi-function battery placing rack as the second battery placing rack 13B:

condition (1): none of the remaining battery placing racks meet the second condition;

condition (2): in the remaining battery placing racks, the number of battery placing racks that meet the second condition is less than the number of battery placing racks that meet the first condition;

condition (3): in the remaining battery placing racks, the number of battery placing racks that meet the second condition is less than the number of battery placing racks that meet the first condition, and the absolute value of the difference value between the two is less than a second difference value threshold;

condition (4): in the remaining battery placing racks, the number of battery placing racks that meet the second condition is less than a second number threshold.

For the fourth one, please refer to the third one, and it is not described in detail herein.

Embodiment 10

A battery swapping control system in this embodiment involves a further improvement based on embodiment 6 and is mainly reflected in the configuration of the battery swapping device for battery installation 12A and the battery swapping device for battery removal 12B by the control unit 11. The battery swapping device 12 is generally divided into two kinds:

a single-function battery swapping with a single structure may comprise a first structure and is only able to be configured as a battery swapping device for battery installation 12A, or comprise a second structure and is only able to be configured as a battery swapping device for battery removal 12B;

a multi-function battery swapping device with a complex structure may comprise both the first structure and the second structure, and is able to be configured as any of the battery swapping device for battery installation 12A and the battery swapping device for battery removal 12B.

The first structure comprises a structure that completes the removal of a battery to be installed from the first battery placing rack 13A and the installation of the battery into the electric vehicle, wherein.

For example, a grab mechanism for the removal of a battery to be installed from the first battery placing rack 13A, a lifting mechanism for the installation of the battery into the electric vehicle and the like.

The second structure comprises a structure that completes the removal of an undercharged battery from the electric vehicle and the placement of the battery onto the second battery placing rack 13B. For example, a release mechanism for the removal of a battery to be installed from the electric vehicle, a placing mechanism for the placement of the battery into the second battery placing rack 13B and the like.

In the battery swapping control system of this embodiment, both the at least two battery swapping device 12 may be single-function battery swapping devices (however, both a single-function battery swapping device with the first structure and a single-function battery swapping device with the second structure are required); or, both may be multi-function battery swapping devices; or, some may be single-function battery swapping devices, and some may be multi-function battery swapping devices.

Figure 5:
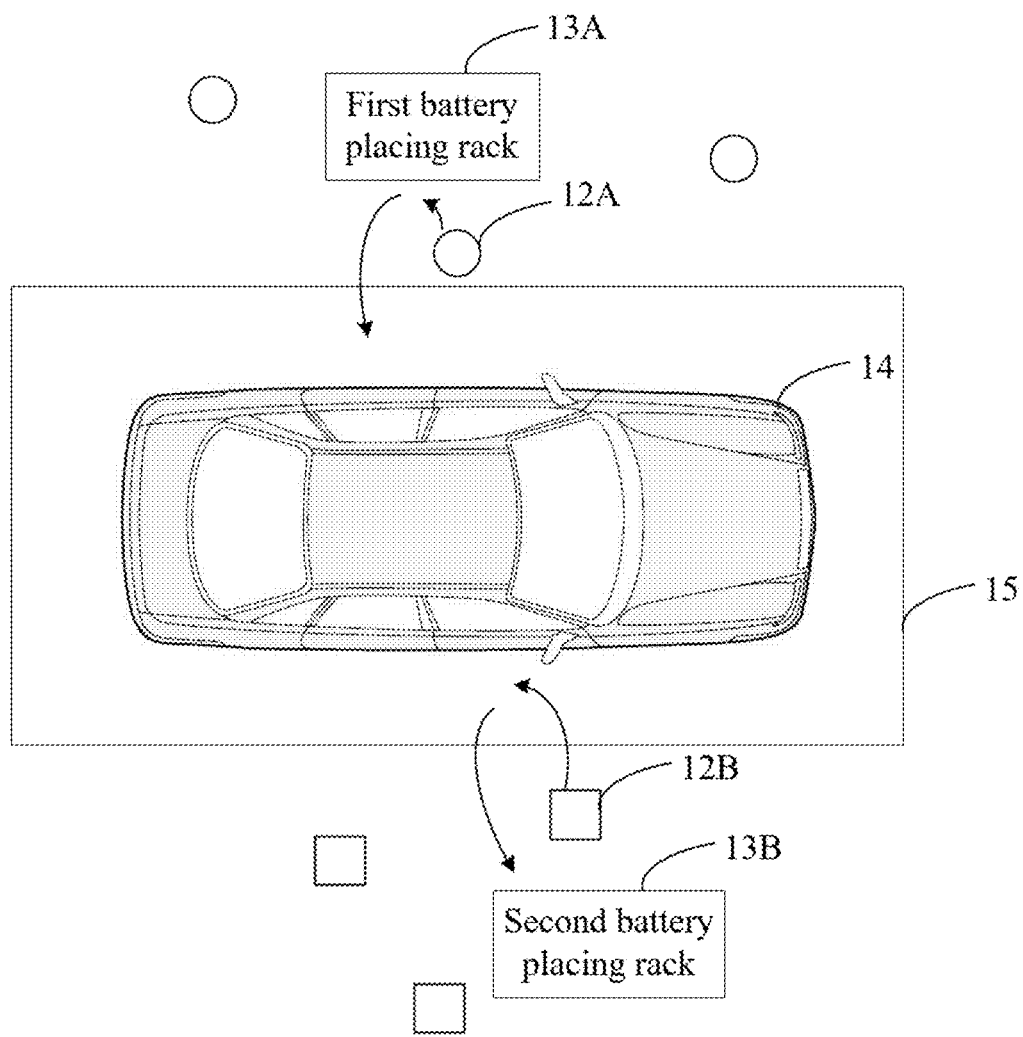
FIG. 5 is a schematic sketch of configuring a battery swapping device for battery installation and a battery swapping device for battery installation in a battery swapping control system according to embodiments 10 and 12 in the present disclosure.

To reduce the move distance and time of the battery swapping device for battery installation 12A and promote the efficient of battery swapping, the nearest battery swapping device to the first battery placing rack 13A is preferably selected to be configured as the battery swapping device for battery installation 12A by the control unit 11. Specifically, as shown in FIG. 5, after the selection of the first battery placing rack 13A, the control unit may determine the location of the first battery placing rack 13A, screen the single-function and multi-function battery swapping devices with the first structure (as represented by ○ in figures), calculate the distances from each single-function battery swapping device and multi-function battery swapping device with the first structure to the first battery placing rack 13A respectively, and select the nearest battery swapping device to configure it as the battery swapping device for battery installation 12A. The arrows at the 12A in the figure indicate the directions of its movement.

To reduce the move distance and time of the battery swapping device for battery installation 12B and promote the efficient of battery swapping, the nearest battery swapping device to the electric vehicle or the nearest battery swapping device to the vehicle carrying platform for parking the electric vehicle is preferably selected to be configured as the battery swapping device for battery removal 12B by the control unit 11. Specifically, the control unit 11 may screen the single-function and multi-function battery swapping devices with the second structure (as represented by n in figures), calculate the distances from each single-function battery swapping device and multi-function battery swapping device with the second structure to the electric vehicle 14 or the vehicle carrying platform 15 respectively, and select the nearest battery swapping device to configure it as the battery swapping device for battery removal 12B. The arrows at the 12B in the figure indicate the directions of its movement.

In other embodiments, each of the battery placing racks has a predetermined binding relationship with at least one of the battery swapping devices for the purpose of facilitating the management and distribution of battery swapping devices, that is, each battery may only be removed and placed by a battery swapping device bound to the battery placing rack.

A battery swapping device having a binding relationship with the first battery placing rack 13A or a battery swapping device having a binding relationship with the first battery placing rack 13A and nearest to the first battery placing rack is preferably selected to be configured as the battery swapping device for battery installation 12A by the control unit 11. Specifically, after the first placing rack 13A is selected, the control unit 11 may screen the single-function and multi-function battery swapping devices with the first structure that have the binding relationships with the first battery placing rack 13A, and select one from them to configured it as the battery swapping device for battery installation 12A, or further determine the location of the first battery placing rack 13A, calculate the distances from the screened battery swapping devices to the first battery placing rack 13A respectively, and select the nearest battery swapping device to configure it as the battery swapping device for battery installation 12A.

A battery swapping device having a binding relationship with the second battery placing rack 13B or a battery swapping device having a binding relationship with the second battery placing rack 13B and nearest to the second battery placing rack is preferably selected to be configured as the battery swapping device for battery removal 12B by the control unit 11. Specifically, after the second placing rack 13B is selected, the control unit 11 may screen the single-function and multi-function battery swapping devices with the second structure that have the binding relationships with the second battery placing rack 13B, and select one from them to configured it as the battery swapping device for battery removal 12B, or further calculate the distances from the screened battery swapping devices to the second battery placing rack 13A respectively, and select the nearest battery swapping device to configure it as the battery swapping device for battery removal 12B.

Embodiment 11

A battery swapping control system in this embodiment involves a further improvement based on embodiment 6 and is mainly reflected in the battery swapping control process of the battery swapping control system. In the embodiment, the battery swapping control process is divided into a battery-swap preparation process before an electric vehicle is parked on the vehicle carrying platform and a battery-swap operation process after an electric vehicle is parked on the vehicle carrying platform.

In the battery-swap preparation process, the control unit 11 is configured to select the second battery placing rack 13B in advance before the electric vehicle is parked on the vehicle carrying platform, wherein the process of the selection of the second battery placing rack 13B can be seen in embodiments 7 to 9 and the process of the configuration of the battery swapping device for battery installation 12B can be seen in embodiment 10.

In the battery-swap operation process, the control unit 11 is further configured to send the third move instruction to the battery swapping device for battery removal 12B, which the third move instruction is configured to command the battery swapping device for battery removal 12B to move to and be parked in a predetermined battery swapping position. The battery swapping device for battery removal 12B is further configured to execute the third move instruction.

The control unit 11 is further configured to send a battery removal instruction to the battery swapping device for battery removal 12B after the electric vehicle is parked on the vehicle carrying platform and the battery swapping device for battery removal 12B is parked in the predetermined battery swapping position, which the battery removal instruction is configured to command the battery swapping device for battery removal to remove the undercharged battery from the electric vehicle. The battery swapping device for battery removal 12B is further configured to execute the battery removal instruction.

In the embodiment, the predetermined battery swapping position refers to a position suitable for battery removal from the electric vehicle parked on the vehicle carrying platform. This could be understood as that the battery is removed from an electric vehicle parked on the vehicle carrying platform with the minimum action by the battery swapping device for battery removal 12B when the battery swapping device for battery removal 12B is located in the predetermined battery swapping position. The predetermined battery swapping position is located below or above the vehicle carrying platform, which the location of the predetermined battery swapping position can specifically depend on the structure of the vehicle carrying platform.

Figure 6:
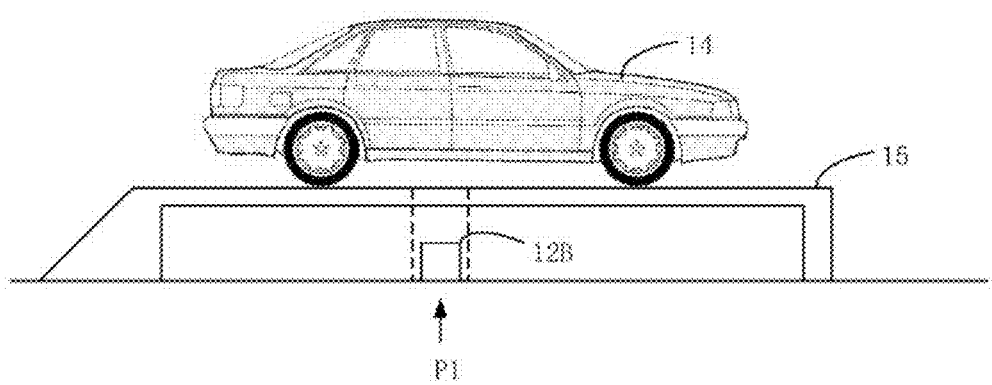
FIG. 6 is a schematic side view of a vehicle carrying platform with a first structure according to embodiments 11 and 13 in the present disclosure.

Take the first structure of the vehicle carrying platform as an example. The vehicle carrying platform is substantially the same as that in embodiment 6, and the difference is that the battery swapping device 12 in embodiment 6 is displaced by the battery swapping device for battery removal 12B. As shown in FIG. 6, the vehicle carrying platform is higher than the ground level and has a hollow area in the middle. An electric vehicle 14 should be parked on the vehicle carrying platform 15 when swapped, and the battery box of the electric vehicle 14 is located above the hollow area. For the vehicle carrying platform 15 with this structure, the predetermined battery swapping position P1 is typically located below the vehicle carrying platform, particularly below the vehicle carrying platform and aligned with the battery box of the electric vehicle 14. For the electric vehicle 14 parked on the vehicle carrying platform 15 for battery swapping, the battery swapping device for battery removal 12B in the predetermined position P1 only needs to raise a release mechanism for releasing the undercharged battery from the electric vehicle vertically, pass through the hollow area, insert the release mechanism into the gap of the electric vehicle 14 between the external battery box and a battery, and touch the shifting block of the battery box to release the undercharged battery, and then remove the undercharged battery.

Figure 7:
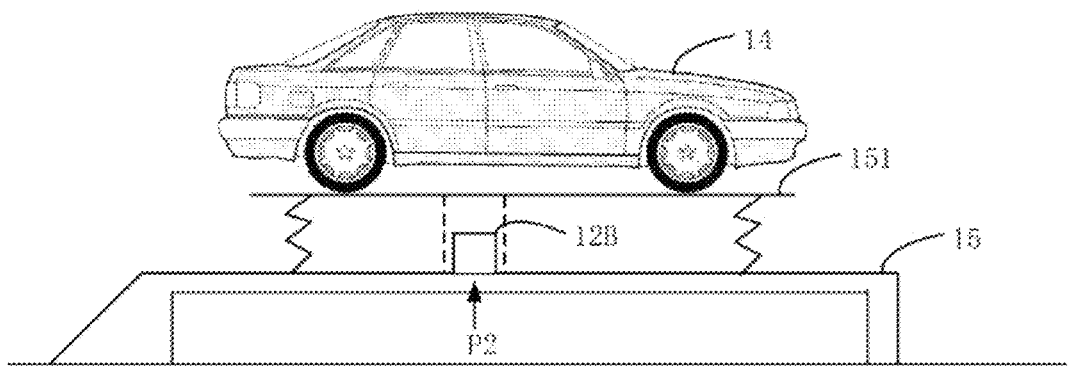
FIG. 7 is a schematic side view of a vehicle carrying platform with a second structure according to embodiments 11 and 13 in the present disclosure.

Then take the second structure of the vehicle carrying platform as an example. The vehicle carrying platform is substantially the same as that in embodiment 6, and the difference is that the battery swapping device 12 in embodiment 6 is displaced by the battery swapping device for battery removal 12B. As shown in FIG. 7, the vehicle carrying platform has a lifting platform 151 in the middle, and a hollow area is provided in the middle of the lifting platform 151. An electric vehicle 14 should be drove onto the vehicle carrying platform 15 and be parked on the lifting platform 151 when swapped, and the battery box of the electric vehicle 14 is located above the hollow area. For the vehicle carrying platform 15 with this structure, the predetermined battery swapping position P2 is typically located above the vehicle carrying platform 15, particularly below the hollow area after the lifting platform 151 is raised. For the electric vehicle 14 parked on the lifting platform 151 for battery swapping, the battery swapping device for battery removal 12B in the predetermined position P2 only needs to raise a release mechanism for releasing the undercharged battery from the electric vehicle vertically, pass through the hollow area, insert the release mechanism into the gap of the electric vehicle 14 between the external battery box and a battery, and touch the shifting block of the battery box to release the undercharged battery, and then remove the undercharged battery. Similarly, the battery swapping device 12 only needs to raise the battery to be installed into the electric vehicle vertically to complete the installation in the predetermined battery swapping position P2.

Of course, the vehicle carrying platform is not limit to the above structures and may be other structures. The predetermined battery swapping position may be set based on the structure of the vehicle carrying platform, and further be set combined with the second structure of the battery swapping device for battery removal 12B and the conditions including the movement path of the second structure of the removal of an undercharged battery.

The control unit 11 is further configured to a fourth move instruction to the battery swapping device for battery removal 12B after the battery removal instruction has been executed by the battery swapping device for battery removal 12B, which the fourth move instruction is configured to command the battery swapping device for battery removal 12B to move to the second battery placing rack 13B, and then place the undercharged battery in the empty battery placing compartment. The battery swapping device for battery removal is further configured to execute the fourth move instruction.

In the battery-swap operation process, the control unit 11 is further configured to scan the number plate of the electric vehicle after the electric vehicle is parked on the vehicle carrying platform or the number plate of the electric vehicle can be observed, and then determine a battery model suitable for the electric vehicle through the number plate. Furthermore, the first battery placing rack 13A is selected, and the battery swapping device for battery installation 12A is configured to send a battery obtainment instruction to the battery swapping device for battery installation 12A, wherein the battery obtainment instruction is configured to command the battery swapping device for battery installation 12A to obtain the battery to be installed from the first battery placing rack 13A. The battery swapping device for battery installation 12A is further configured to execute the battery obtainment instruction. The selection process of the first battery placing rack 13A can be seen in embodiments 7-9, and the configuration process of the battery swapping device for battery installation 12A can be seen in embodiment 10, wherein.

The control unit 11 is further configured to send a first move instruction to the battery swapping device for battery installation 12A after the battery obtainment instruction is executed by the battery swapping device for battery installation 12A, wherein the first move instruction is configured to command the battery swapping device for battery installation 12A to be parked in a first predetermined waiting position in advance, which the first predetermined waiting position refers to a position within a first distance threshold from the vehicle carrying platform. The battery swapping device for battery installation is further configured to execute the first move instruction.

The control unit 11 is further configured to send a fifth move instruction to the battery swapping device for battery installation 12A after the battery swapping device for battery removal 12B leaves the predetermined battery swapping position or leaves a third distance threshold away from the predetermined battery swapping position, which the fifth move instruction is configured to command the battery swapping device for battery installation 12A to move to the predetermined battery swapping position. The battery swapping device for battery installation 12A is further configured to execute the fifth move instruction.

The control unit 11 is further configured to send a battery installation instruction to the battery swapping device for battery installation 12A after the fifth battery move instruction is executed by the battery swapping device for battery installation 12A, which the battery installation instruction is configured to command the battery swapping device for battery installation 12A to install the battery to be installed into the electric vehicle. The battery swapping device for battery installation 12A is further configured to execute the battery installation instruction. At this point, the battery swapping of the electric vehicle is completed, and the battery swapping device for battery installation 12A leaves the predetermined battery swapping position.

Embodiment 12

A battery swapping control system in this embodiment involves a further improvement based on embodiment 6 and is mainly reflected in the battery swapping control process of the battery swapping control system. In the embodiment, the battery swapping control process is divided into a battery-swap preparation process before an electric vehicle is parked on the vehicle carrying platform and a battery-swap operation process after an electric vehicle is parked on the vehicle carrying platform. In the battery-swap preparation process and the battery-swap operation process, the control instructions of the control unit are different compared with those in embodiment 11.

In the battery-swap preparation process, the control unit 11 may select the second battery placing rack 13B, configure the battery swapping device for battery removal 12B, and control the battery swapping device for battery removal 12B to complete part instructions in advance, such that the time of battery removal is reduced. The selection process of the second battery placing rack 13B can be seen in embodiments 7-9, and the configuration process of the battery swapping device for battery removal 12B can be seen in embodiment 10, wherein.

Wherein, controlling the battery swapping device for battery removal 12B by the control unit 11 to complete part instructions comprises: the control unit 11 determines whether the predetermined battery swapping position is in parking available condition so as to set a second predetermined waiting position, and send a second move instruction to the battery swapping device for battery removal 12B, wherein the second move instruction is configured to command the battery swapping device for battery removal 12B to command the battery swapping device for battery removal 12B to be parked in the second predetermined waiting position in advance; the battery swapping device for battery removal 12B is further configured to execute the second move instruction. The second predetermined waiting position is related to the predetermined battery swapping position, and may be the same as or near the predetermined battery swapping position wherein (the description of the predetermined battery swapping position please see in embodiment 11).

The determination of whether the predetermined battery swapping position is in parking available condition may specifically comprises:
  the predetermined battery swapping position is in parking available condition as all the following conditions are satisfied, otherwise, the predetermined battery swapping position is in parking non-available condition:
  condition (1): the predetermined battery swapping position is an empty space;
  condition (2): existing an access for the battery swapping device for battery removal 12B to move to the predetermined battery swapping position;
  condition (3): it is predicted that the battery swapping device for battery removal 12B does not obstruct an electric vehicle moving to the vehicle carrying platform when the battery swapping device is parked in the predetermined battery swapping position.

Whether condition (3) is met may typically depend on the structure of the vehicle carrying platform.

Take the vehicle carrying platform with the first structure in embodiment 11 as an example. Due to the electric vehicle is parked on the vehicle carrying platform during battery swapping while the predetermined battery position is typically located below the vehicle carrying platform, the battery swapping device for battery removal 12B does not obstruct an electric vehicle moving to the vehicle carrying platform though the battery swapping device for battery removal 12B is parked in the predetermined battery swapping position before the electric vehicle moves onto the vehicle carrying platform in the common case. This enable condition (3) is satisfied.

Now take the vehicle carrying platform with second structure in embodiment 11 as an example. Due to the electric vehicle is parked on the vehicle carrying platform during battery swapping while the predetermined battery position typically is also located above the vehicle carrying platform, the battery swapping device for battery removal 12B may obstruct an electric vehicle moving to the vehicle carrying platform if the battery swapping device for battery removal 12B is parked in the predetermined battery swapping position before the electric vehicle moves onto the vehicle carrying platform. Therefore, the predetermined battery swapping position does not satisfy condition (3) typically for the second structure of the vehicle carrying platform, and then it is in parking non-available condition.

The second predetermined waiting position is the same as the predetermined battery swapping position when the predetermined battery swapping position is in parking available condition. The second predetermined waiting position refers to a position within a second distance threshold from the predetermined battery swapping position, i.e. a position near the predetermined battery swapping position, when the predetermined battery swapping position is in parking non-available condition.

At this point, the battery swapping of the electric vehicle is completed, and the battery swapping control system waits for the electric vehicle to enter and park on the vehicle carrying platform to proceed to the battery-swap operation process.

In the battery-swap operation process, the control unit 11 determine whether the second predetermined waiting position of the battery swapping device for battery removal 12B is the same as the predetermined battery swapping position:

if so, sending a battery removal instruction to the battery swapping device for battery removal 12B, which the battery removal instruction is configured to command the battery swapping device for battery removal 12B to remove the undercharged battery from the electric vehicle; the battery swapping device for battery removal 12B is further configured to execute the battery removal instruction;

if not, sending a fine-tuning instruction to the battery swapping device for battery removal 12B, which the fine-tuning instruction is configured to command the battery swapping device for battery removal 12B to move to the predetermined battery swapping position from the predetermined waiting position; the battery swapping device for battery removal 12B executes the fine-tuning instruction; then, the control unit 11 sends the battery removal instruction to the battery swapping device for battery removal 12B; the battery swapping device for battery removal 12B is further configured to execute the battery removal instruction.

The control unit 11 is further configured to send a fourth move instruction to the battery swapping device for battery removal 12B after the battery removal instruction has been executed by the battery swapping device for battery removal 12B, which the fourth move instruction is configured to command the battery swapping device for battery removal 12B to move to the second battery placing rack 13B, and then place the undercharged battery in the empty battery placing compartment. The battery swapping device for battery removal 12B is further configured to execute the fourth move instruction.

In the battery-swap operation process, the control unit 11 is further configured to scan the number plate of the electric vehicle after the electric vehicle is parked on the vehicle carrying platform or the number plate of the electric vehicle can be observed, and then determine a battery model suitable for the electric vehicle through the number plate. Furthermore, the first battery placing rack 13A is selected, and the battery swapping device for battery installation 12A is configured to send a battery obtainment instruction to the battery swapping device for battery installation 12A, wherein the battery obtainment instruction is configured to command the battery swapping device for battery installation 12A to obtain the battery to be installed from the first battery placing rack 13A. The battery swapping device for battery installation 12A is further configured to execute the battery obtainment instruction.

The control unit 11 is further configured to send a first move instruction to the battery swapping device for battery installation 12A after the battery obtainment instruction is executed by the battery swapping device for battery installation 12A, wherein the first move instruction is configured to command the battery swapping device for battery installation 12A to be parked in a first predetermined waiting position in advance, which the first predetermined waiting position refers to a position within a first distance threshold from the vehicle carrying platform. The battery swapping device for battery installation is further configured to execute the first move instruction.

The control unit 11 is further configured to send a fifth move instruction to the battery swapping device for battery installation 12A after the battery swapping device for battery removal 12B leaves the predetermined battery swapping position or leaves a third distance threshold away from the predetermined battery swapping position, which the fifth move instruction is configured to command the battery swapping device for battery installation 12A to move to the predetermined battery swapping position. The battery swapping device for battery installation 12A is further configured to execute the fifth move instruction.

The control unit 11 is further configured to send a battery installation instruction to the battery swapping device for battery installation 12A after the fifth battery move instruction is executed by the battery swapping device for battery installation 12A, which the battery installation instruction is configured to command the battery swapping device for battery installation 12A to install the battery to be installed into the electric vehicle. The battery swapping device for battery installation 12A is further configured to execute the battery installation instruction. At this point, the battery swapping of the electric vehicle is completed, and the control unit 11 command the battery swapping device for battery installation 12A to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Embodiment 13

A battery swapping control system in accordance with this embodiment is shown in FIG. 4. The system is substantially the same as that in embodiment 6, and the difference is that the battery suitable for an electric vehicle in this embodiment typically refers to the same model of a battery used in the electric vehicle.

Embodiment 14

A battery swapping control system in this embodiment involves a further improvement based on embodiment 13. The improvement in this embodiment based on embodiment 13 is substantially the same as the improvement in embodiment 7 based on embodiment 6. The difference is that the first condition may be set to a have a fully charged battery suitable for the electric vehicle;

or, to improve the in order to promote the probability of being able to swap a battery of the electric vehicle, the first condition may be preferably set to have a fully charged battery with the battery model, and if none of the battery placing racks meets the first condition, the first condition is modified as having a battery of the battery model with the highest power. Similarly, the first condition is set by default to have a fully charged battery with the battery model, and the control unit 11 is configured to determine whether the at least one battery placing rack comprises a battery placing rack that meets the default first condition, and if so, select one as the first battery placing rack 13A from the at least one battery placing rack, if not:

modifying the first condition as having a battery of the battery model with the highest power, and then determining whether the at least one battery placing rack comprises a battery placing rack that meets the current first condition again and if so, select one as the first battery placing rack 13A from the at least one battery placing rack. If there is still no battery placing rack meets the first condition, the control unit 11 may send out an alarm signal to indicate that the battery swapping of the electric vehicle is unavailable.

Embodiment 15

A battery swapping control system in this embodiment involves a further improvement based on embodiments 13 or 14. The improvement of this embodiment based on embodiments 13 or 14 is substantially the same as that of embodiment 8 based on embodiments 6 or 7, and the difference is that, in this embodiment, the nearest battery placing rack to the vehicle carrying platform for parking the electric vehicle is selected as the first battery placing rack 13A if the electric vehicle does not be parked. Similarly, the nearest battery placing rack to the vehicle carrying platform for parking the electric vehicle is selected as the second battery placing rack 13B if the electric vehicle does not be parked. Moreover, the vehicle carrying platform may be a special platform for battery swapping or other common parking-available platforms that are convenient for battery swapping in this embodiment.

Embodiment 16

A battery swapping control system in this embodiment involves a further improvement based on embodiments 13 or 14. The improvement in this embodiment based on embodiments 13 or 14 please refer to the improvement in embodiment 9 based on embodiments 6 or 7.

Embodiment 17

A battery swapping control system in this embodiment involves a further improvement based on embodiment 13. The improvement of this embodiment based on embodiment 13 is substantially the same as that of embodiment 10 based on embodiment 6, and the difference is that, the nearest battery swapping device to the vehicle carrying platform for parking the electric vehicle is preferably selected if the electric vehicle has not been parked. Similarly, the distances between each selected battery swapping device and the vehicle carrying platform 15 are calculated respectively if the electric vehicle 14 has not been parked.

In other embodiments, when each of the battery placing racks has a predetermined binding relationship with at least one of the battery swapping devices,
a battery swapping device having a binding relationship with the second battery placing rack 13B and nearest to the vehicle carrying platform rack for parking the electric vehicle, is preferably selected if the electric vehicle has not been parked. Similarly, the distance between the selected battery swapping device and the vehicle carrying platform is calculated if the electric vehicle has not been parked.

Embodiment 18

A battery swapping control system in this embodiment involves a further improvement based on embodiment 13. The improvement of this embodiment based on embodiment 13 is substantially the same as that of embodiment 11 based on embodiment 6, and the difference is that, in this embodiment, the selection process of the second battery placing rack 13B can be seen in embodiments 14-16, and the configuration process of the battery swapping device for battery removal 12B can be seen in embodiment 17.

Furthermore, in this embodiment, the control unit 11 is further configured to select the first battery placing rack 13A, then configured the battery swapping device for battery installation 12A, and send a battery obtainment instruction to the battery swapping device for battery installation 12A, which the battery obtainment instruction is configured to command the battery swapping device for battery installation 12A to obtain the battery to be installed from the first battery placing rack 13A. The battery swapping device for battery installation 12A is further configured to execute the battery obtainment instruction. The selection process of the first battery placing rack 13A can be seen in embodiments 14-16, and the configuration process of the battery swapping device for battery installation 12A can be seen in embodiment 17, wherein.

Embodiment 19

A battery swapping control system in this embodiment involves a further improvement based on embodiment 13. The improvement of this embodiment based on embodiment 13 is substantially the same as that of embodiment 12 based on embodiment 6, and the difference is that, if the battery model suitable for the electric vehicle is predictable before the electric vehicle is parked on the vehicle carrying platform, the control unit 11 may further select the first battery placing rack 12A, completely configure the battery swapping device for battery removal 12B, and control the accomplishment of part instructions of the battery swapping device for battery removal 12A, to reduce the time of battery installation. The selection process of the second battery placing rack 13B can be seen in embodiments 14-16, and the configuration process of the battery swapping device for battery removal 12B can be seen in embodiment 17, wherein. Moreover, the battery model suitable for the electric vehicle may be known beforehand by the following way: the vehicle carrying platform is only provided for parking an electric vehicle suitable for the battery of the model. For example, a vehicle carrying platform is predetermined that limited to park an electric vehicle with a specific model of a battery, it can thus be determined that the battery model suitable for the electric vehicle has to be the specific model no matter whether the electric vehicle is already parked on the vehicle carrying platform.

Wherein controlling the battery swapping device for battery installation 12A by the control unit 11 to complete part instructions comprises: the control unit 11 send a battery obtainment instruction to the battery swapping device for battery installation 12A, which the battery obtainment instruction is configured to command the battery swapping device for battery installation 12A to obtain the battery to be installed from the battery placing rack 13A. The battery swapping device for battery installation 12A is further configured to execute the battery obtainment instruction.

The control unit 11 is further configured to send a first move instruction to the battery swapping device for battery installation 12A after the battery obtainment instruction is executed by the battery swapping device for battery installation 12A, wherein the first move instruction is configured to command the battery swapping device for battery installation 12A to be parked in a first predetermined waiting position in advance, which the first predetermined waiting position refers to a position within a first distance threshold from the vehicle carrying platform. The battery swapping device for battery installation 12A is further configured to execute the first move instruction.

At this point, the battery-swap preparation process is completed. The battery swapping control system waits for the electric vehicle to enter and park onto the vehicle carrying platform to proceed to the battery-swap operation process.

In the battery-swap operation process, the control unit 11 determines whether the second predetermined waiting position of the battery swapping device for battery installation 12A is the same as the predetermined battery swapping position:

- if so, sending a battery removal instruction to the battery swapping device for battery removal 12B, which the battery removal instruction is configured to command the battery swapping device for battery removal 12B to remove the undercharged battery from the electric vehicle; the battery swapping device for battery removal 12B is further configured to execute the battery removal instruction;
- if not, sending a fine-tuning instruction to the battery swapping device for battery removal 12B, which the fine-tuning instruction is configured to command the battery swapping device for battery removal 12B to move to the predetermined battery swapping position from the predetermined waiting position; the battery swapping device for battery removal 12B executes the fine-tuning instruction; then, the control unit 11 sends the battery removal instruction to the battery swapping device for battery removal 12B; the battery swapping device for battery removal 12B is further configured to execute the battery removal instruction.

The control unit 11 is further configured to send a fourth move instruction to the battery swapping device for battery removal 12B after the battery removal instruction has been executed by the battery swapping device for battery removal 12B, which the fourth move instruction is configured to command the battery swapping device for battery removal 12B to move to the second battery placing rack 13B, and then place the undercharged battery in the empty battery placing compartment. The battery swapping device for battery removal 12B is further configured to execute the fourth move instruction.

The control unit 11 is further configured to send a fifth move instruction to the battery swapping device for battery installation after the battery swapping device for battery removal 12B leaves the predetermined battery swapping position or leaves a third distance threshold away from the predetermined battery swapping position, which the fifth move instruction is configured to command the battery swapping device for battery installation 12A to move to the predetermined battery swapping position. The battery swapping device for battery installation is further configured to execute the fifth move instruction.

The control unit 11 is further configured to send a battery installation instruction to the battery swapping device for battery installation 12A after the fifth battery move instruction is executed by the battery swapping device for battery installation 12A, which the battery installation instruction is configured to command the battery swapping device for battery installation 12A to install the battery to be installed into the electric vehicle. The battery swapping device for battery installation 12A is configured to execute the battery installation instruction. At this point, the battery swapping of the electric vehicle is completed, and the control unit 11 command the battery swapping device for battery installation 12A to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Embodiment 20

Figure 8:
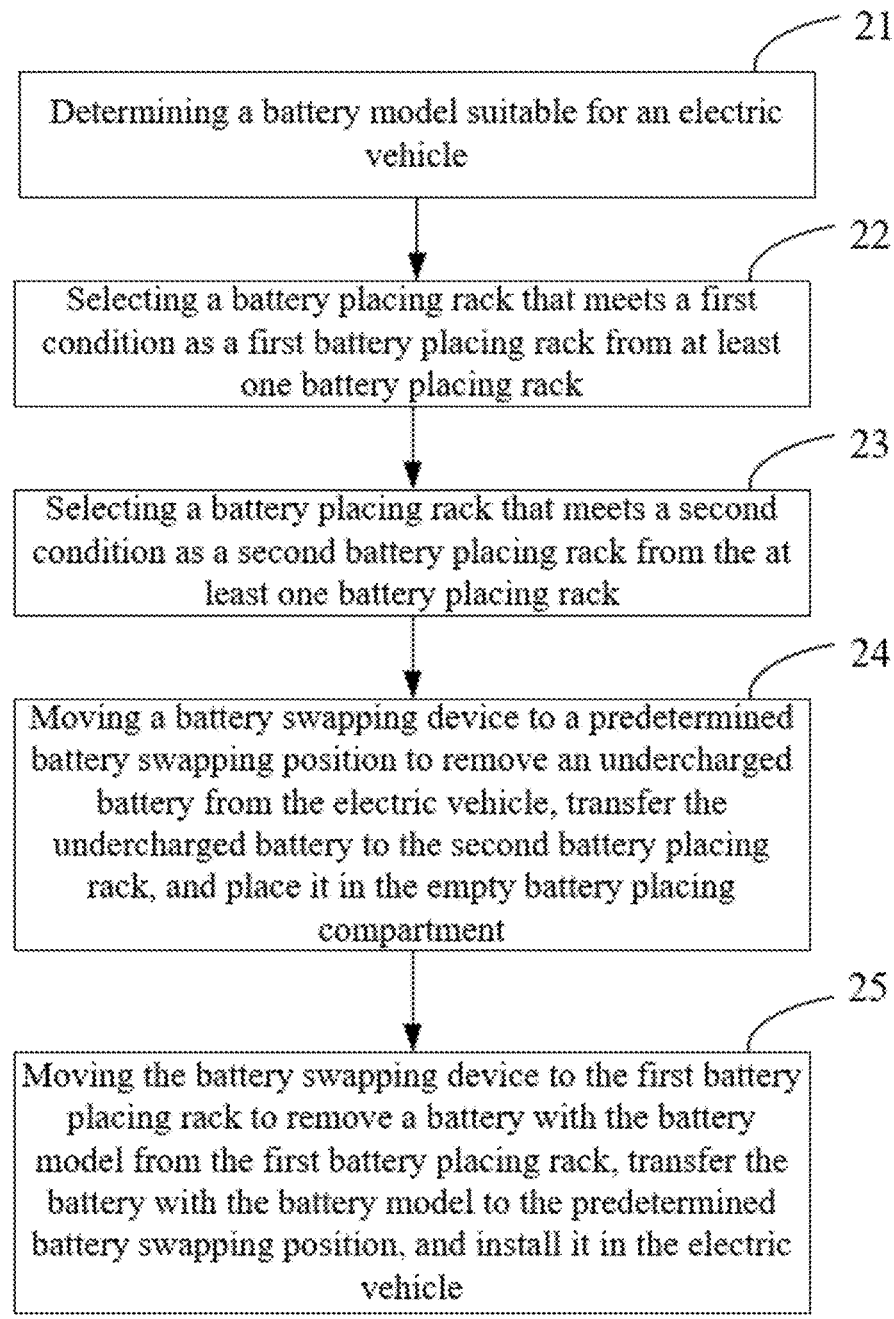
FIG. 8 is a flow diagram of a battery swapping control method according to embodiment 20 in the present disclosure.
Figure 9:
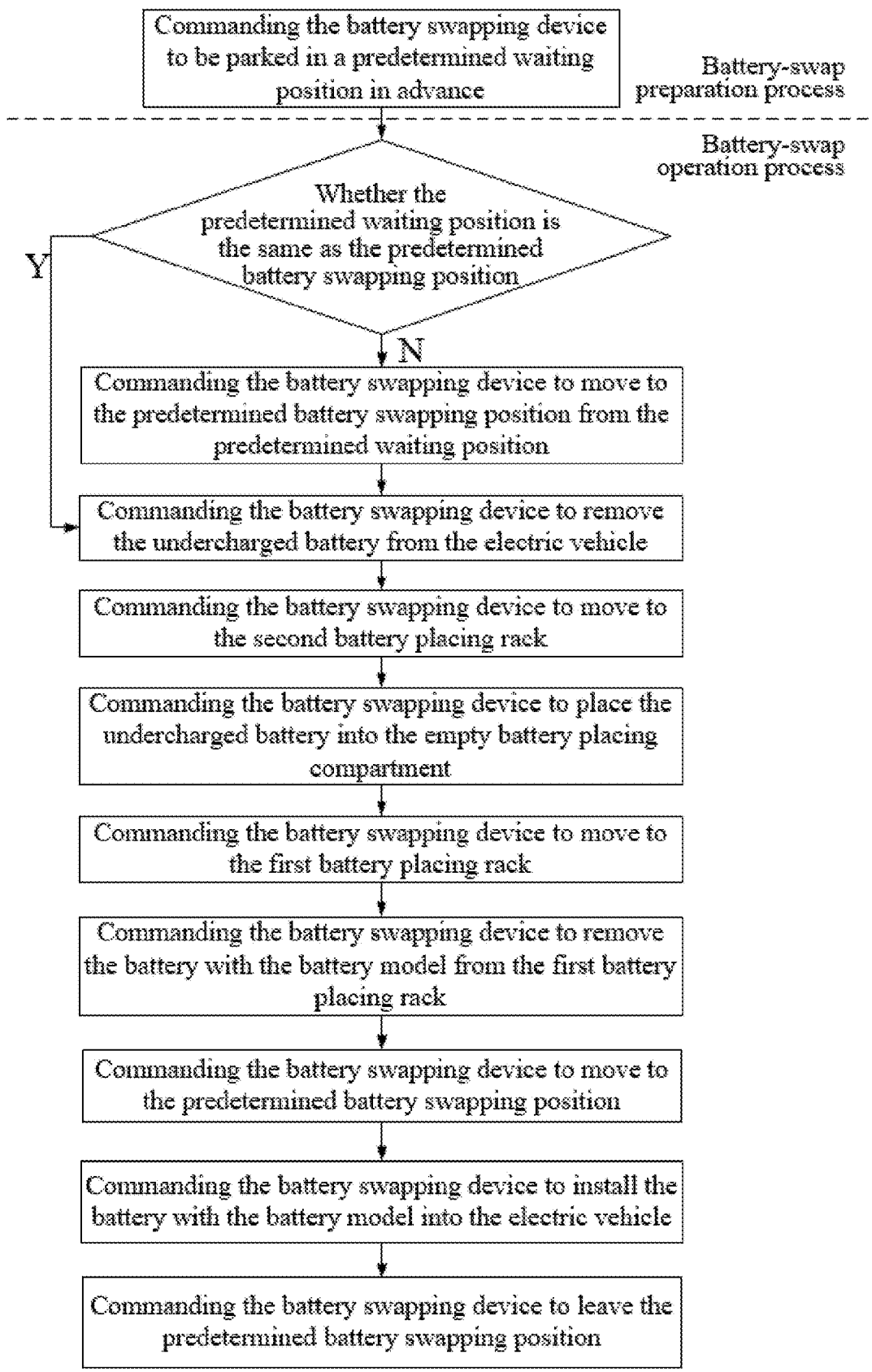
FIG. 9 is a flow diagram of a battery swapping control method according to embodiment 24 in the present disclosure.

A battery swapping control method is shown in FIG. 8. The battery swapping control method comprises:

- step 21. determining a battery model suitable for an electric vehicle. Specifically, it is able to scan the number plate of the electrical vehicle, and then determine a battery model suitable for the electric vehicle through the number plate;
- step 22. selecting a battery placing rack that meets a first condition as a first battery placing rack from at least one battery placing rack, which the battery placing racks have several battery placing compartments for battery placement, and the first condition is set to have a battery with the battery model;
- step 23. selecting a battery placing rack that meets a second condition as a second battery placing rack from the at least one battery placing rack, which the second condition is set to have an empty battery placing compartment;
- step 24. moving a battery swapping device to a predetermined battery swapping position to remove an undercharged battery from the electric vehicle, transfer the undercharged battery to the second battery placing rack, and place it in the empty battery compartment, the predetermined battery swapping position refers to a position suitable for removing and installing batteries from/in the electric vehicle;
- step 25. moving the battery swapping device to the first battery placing rack to obtain a battery with the battery model from the first battery placing rack, transfer the battery with the battery model to the predetermined battery swapping position, and install it in the electric vehicle.

In this embodiment, the determination of a battery model suitable for the electric vehicle is convenient for the selection of the first battery placing rack; the smooth movement of the battery swapping device in the whole process promotes the speed and efficiency of battery swapping.

In this embodiment, the predetermined battery swapping position could be interpreted as the battery is able to be removed or installed from/into an electric vehicle with the minimum action when the battery swapping device is located in the predetermined battery swapping position. The predetermined battery swapping position is located below or above the vehicle carrying platform, which the location of the predetermined battery swapping position can specifically depend on the structure of the vehicle carrying platform.

Embodiment 21

A battery swapping control method in this embodiment involves a further improvement based on embodiment 20 and is mainly reflected in the set of a first condition. As a basis of the selection of the first battery placing rack, the first condition may set other preferred supplementary conditions except for the necessity of having the battery with the battery model. In this embodiment, the supplementary conditions are mainly related to the battery power, and the battery swapping control method also comprises: monitoring the level of batteries placed on the battery placing rack.

Specifically, the first condition is set to have a fully charged battery with the battery model. Correspondingly, step 22 determines whether the at least one battery placing rack comprises a battery placing rack that meets the first condition, and if so, select one as the first battery placing rack from the at least one battery placing rack. If none of the battery placing racks meets the first condition, sending out an alarm signal to indicate that the battery swapping of the electric vehicle is unavailable.

Or, in order to promote the probability of being able to swap a battery of the electric vehicle, the first condition may be preferably set to have a fully charged battery with the battery model, and if none of the battery placing racks meets the first condition, the first condition is modified as having a battery of the battery model with the highest power. Similarly, the first condition is set by default to have a fully charged battery with the battery model, and step 22 determines whether the at least one battery placing rack comprises a battery placing rack that meets the default first condition, and if so, select one as the first battery placing rack from the at least one battery placing rack, if not:

modifying the first condition as having a battery of the battery model with the highest power, and then determining whether the at least one battery placing rack comprises a battery placing rack that meets the current first condition again and if so, select one as the first battery placing rack from the at least one battery placing rack. If there is still no battery placing rack meets the first condition, sending out an alarm signal to indicate that the battery swapping of the electric vehicle is unavailable.

In addition, the empty battery placing compartment is further configured to charge the undercharged battery in this embodiment. Specifically, the empty battery placing compartment comprises a battery charging circuit, which the battery charging circuit involves constant electrical parameters that match the battery model; or, the battery charging circuit involves adjustable electrical parameters, and the control unit is further configured to adjust the electrical parameters based on the battery model such that the electrical parameters match the battery model. The electrical parameters comprise current, voltage and the like.

Of course, in other embodiments, the first condition may be set to other condition according requirements.

Embodiment 22

A battery swapping control method in this embodiment involves a further improvement based on embodiments 20 or 21 and is mainly reflected in the selections of a first battery placing rack and a second battery placing rack. Two or more battery placing racks may meet the first condition or second condition when the number of the battery placing rack is two or even more. The method may further set the selection requirements of the battery placing rack and the second battery placing rack based on needs.

In this embodiment, in order to deal with the case that two or more battery placing racks meet the first condition, step 22 also comprises determining whether more than one battery placing rack meets the first condition, and if so:

or, select the battery placing rack closest to the electric vehicle or the battery placing rack closest to the vehicle carrying platform for parking the electric vehicle as the first battery placing rack from battery placing racks that meet the first condition, such that the move distance and time of the battery swapping device are reduced, and battery swapping efficiency is increased;

or, select one battery placing rack located on a path between the second battery placing rack and the electric vehicle as the first battery placing rack, or select the battery placing rack closest to the electric vehicle or the battery placing rack closest to the vehicle carrying platform as the first battery placing rack, wherein the battery placing rack is located on the path.

Of course, if only one battery placing rack meets the first condition, it is typically only used as the first battery placing rack.

Similarly, in order to deal with the case that two or more battery placing racks meet the second condition, step 23 also comprises determining whether more than one battery placing rack meets the second condition, and if so:

select one battery placing rack as the second placing rack from battery placing racks that meet the second condition randomly;

or, select the battery placing rack closest to the electric vehicle or the battery placing rack closest to a vehicle carrying platform for parking the electric vehicle as the first battery placing rack from battery placing racks that meet the second condition, such that the move distance and time of the battery swapping device are reduced, and battery swapping efficiency is increased.

Of course, if only one battery placing rack meets the second condition, it is typically only used as the second battery placing rack.

In order to further facilitate the positioning of each battery placing rack, the selection of the first battery placing rack/the second battery placing rack, and the reduced move distance of the battery swapping device, the battery placing rack may be disposed on both sides of the vehicle carrying platform along the direction which the electric vehicle is entering, wherein the vehicle carrying platform may be a special platform for battery swapping or other common parking-available platforms that are convenient for battery swapping.

The selection of the first battery placing rack and the selection of the second battery placing rack are relatively independent in this embodiment. In other words, the selection requirements of the first battery placing rack and the second battery placing rack may be set respectively based on the various needs.

Embodiment 23

A battery swapping control method in this embodiment involves a further improvement based on embodiments 20 or 21 and is mainly reflected in the selections of a first battery placing rack and a second battery placing rack. Different form embodiment 21, the association between the first battery placing rack and the second battery placing rack is considered to some extent in this embodiment.

Specifically, the method also comprises determining whether the at least one battery placing rack comprises a multi-function battery placing rack that meets both the first condition and the second condition.

If the at least one battery placing rack does not comprise the multi-function battery placing rack, the first battery placing rack may be select from the battery placing racks that meet the first condition and the second battery placing rack may be select from the battery placing racks that meet the second condition, respectively, in accordance with embodiment 21.

If the at least one battery placing rack comprises the multi-function battery placing rack, the multi-function battery placing rack is used as both the first battery placing rack and the second battery placing rack simultaneously such that the move distance of the battery swapping device is reduced.

Embodiment 24

A battery swapping control method in this embodiment involves a further improvement based on embodiment 20 and is mainly reflected in the control process for the swapping device. The entire battery swapping process could be divided into the battery-swap preparation process before an electric vehicle is parked on the vehicle carrying platform and the battery-swap operation process after an electric vehicle is parked on the vehicle carrying platform.

In the battery-swap preparation process, the battery swapping control method comprises: command the battery swapping device to be parked in a predetermined waiting position in advance. The predetermined waiting position is related to the predetermined battery swapping position and may be the same position as the predetermined battery swapping position or a position near the predetermined battery swapping position.

In this embodiment, the predetermined waiting position is the same as the predetermined battery swapping position when the predetermined battery swapping position is in parking-available condition.

The predetermined waiting position refers to a position within a first distance threshold from the predetermined battery swapping position when the predetermined battery swapping position is in parking non-available condition.

Specifically, the predetermined battery swapping position is in parking available condition as all the following conditions are satisfied, otherwise, the predetermined battery swapping position is in parking non-available condition:

the predetermined battery swapping position is an empty space;

existing an access for the battery swapping device to move to the predetermined battery swapping position;

it is predicted that the battery swapping device does not obstruct an electric vehicle moving to the vehicle carrying platform when the battery swapping device is parked in the predetermined battery swapping position.

At this point, the battery-swap preparation process is completed. The battery swapping control system waits for the electric vehicle to enter and park onto the vehicle carrying platform to proceed to the battery-swap operation process.

In the battery-swap operation process, the battery swapping control method comprises:

determining whether the predetermined waiting position is the same as the predetermined battery swapping position:

if so, command the battery swapping device to remove the undercharged battery from the electric vehicle;

if not, command the battery swapping device to move to the predetermined battery swapping position from the predetermined waiting position; then, command the battery swapping device to remove an undercharged battery from the electric vehicle;

after the battery swapping device removes the undercharged battery from the electric vehicle, command the battery swapping device to move to the second battery placing rack;

next, command the battery swapping device to place the undercharged battery into the empty battery compartment;

next, command the battery swapping device to move to the first battery placing rack;

next, command the battery swapping device to obtain the battery of the battery model from the first battery placing rack;

next, command the battery swapping device to move to the predetermined battery swapping position;

next, command the battery swapping device to install the battery with the battery model into the electric vehicle;

at this point, the battery swapping of the electric vehicle is completed, and the battery swapping device is finally commanded to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Embodiment 25

Figure 10:
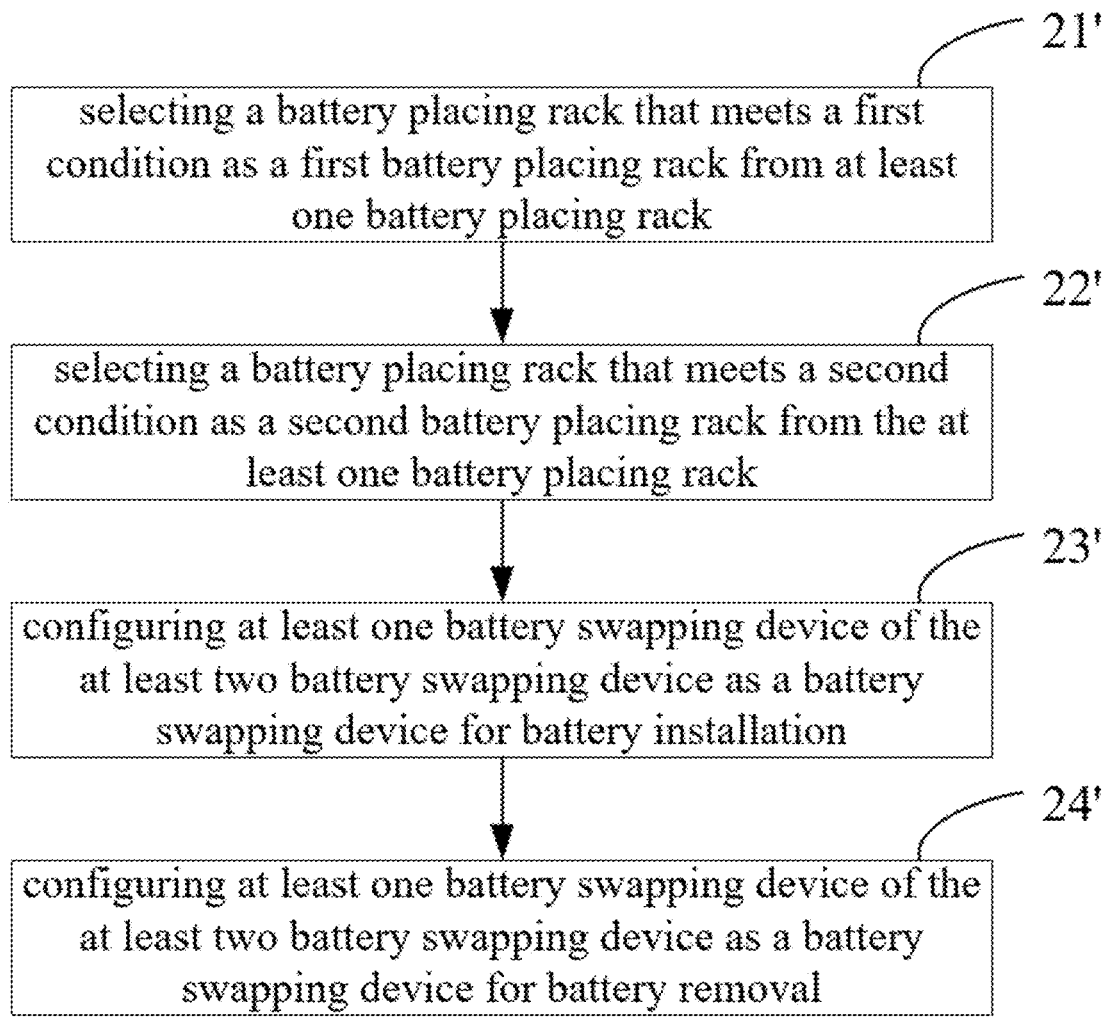
FIG. 10 is a flow diagram of a battery swapping control method according to embodiment 25 in the present disclosure.

A battery swapping control method in this embodiment is shown in FIG. 10. The battery swapping control method comprises:

step 21'. selecting a battery placing rack that meets a first condition as a first battery placing rack from at least one battery placing rack, wherein the battery placing racks have several battery placing compartments for battery placement, and the first condition is set to have a battery suitable for an electric vehicle;

step 22'. selecting a battery placing rack that meets a second condition as a second battery placing rack from the at least one battery placing rack, which the second condition is set to have an empty battery placing compartment;

step 23'. configuring at least one battery swapping device of the at least two battery swapping device as a battery swapping device for battery installation, wherein the battery swapping device for battery installation is configured to transfer a battery to be installed, which is a battery that obtained from the first battery placement, suitable for the electric vehicle and will be installed into the electric vehicle;

step 24'. configuring at least one battery swapping device of the at least two battery swapping device as a battery swapping device for battery removal, wherein the battery swapping device for battery removal is configured to transfer an undercharged battery, which is a battery that removed from the electric vehicle and will be placed in the empty battery compartment.

The above sequence of the steps is only a possible sequence of each of the steps above, in other embodiments, each of the steps above may adopt to other sequences, for example, perform step 22' first, and then follow steps 24', 21' and 23' in turn, or, perform step 21' first, and then follow steps 23', 22' and 24' in turn.

In this embodiment, two battery swapping devices are used during the entire process of the battery swapping for a vehicle, which are the battery swapping device for battery installation and the battery swapping device for battery removal. The moving track of the battery swapping device for battery installation is between the first battery placing rack and the electric vehicle to transport the battery to be installed, and the moving track of the battery swapping device for battery removal is between the electric vehicle and the second battery placing rack to transport the undercharged battery. The two battery swapping devices work with separate responsibilities to accomplish the battery swapping task together, which enables the whole battery swapping time is reduced to be at least half of that only one battery swapping device is used and improves the speed and efficiency of battery swapping, thereby.

Embodiment 26

A battery swapping control method in this embodiment involves a further improvement based on embodiment 26.

The improvement based on embodiment 25 is substantially the same as the improvement in embodiment 21 based on embodiment 20, and the difference is that the battery swapping control method also comprises: monitoring the level of each battery in real time, which facilitates the selection of the first battery placing rack.

Embodiment 27

A battery swapping control method in this embodiment involves a further improvement based on embodiments 25 or 26. The improvement based on embodiments 25 or 26 is substantially the same as the improvement in embodiment 22 based on embodiments 20 or 21, and the difference is, in this embodiment, the battery placing rack may be disposed on both sides of the vehicle carrying platform along the direction which the electric vehicle is entering, so as to further facilitate the positioning of each battery placing rack, the selection of the first battery placing rack/the second battery placing rack, and the reduced move distance of the battery swapping device for battery installation/the battery swapping device for battery removal.

Embodiment 28

A battery swapping control method in this embodiment involves a further improvement based on embodiments 25 or 26 and is mainly reflected in the selections of the first battery placing rack and the second battery placing rack. Different from embodiment 27, when selecting the first battery placing rack and the second battery placing rack, the association of the two is considered to some extent in this embodiment.

The battery swapping control method also comprises:
determining whether the at least one battery placing rack comprises a multi-function battery placing rack that meets both the first condition and the second condition:
if the at least one battery placing rack does not comprise the multi-function battery placing rack, the first battery placing rack may be select from the battery placing racks that meet the first condition and the second battery placing rack may be select from the battery placing racks that meet the second condition, respectively, in accordance with embodiment 27;
if the at least one battery placing rack comprises the multi-function battery placing rack, the multi-function battery placing rack is used preferably, and the identity of the multi-function battery placing rack is configured by selecting one of the following four ways:

First, use the multi-function battery placing rack as both the first battery placing rack and the second battery placing rack simultaneously.

Second, use the multi-function battery placing rack as any of the first battery placing rack and the second battery placing rack.

Third, in order to maintain the number of the battery placing rack that meets the first condition and the battery placing rack that meets the second condition in balance, select any of the following conditions as a necessary condition of using the multi-function battery placing rack as the first battery placing rack:
condition (1): none of the remaining battery placing racks meet the first condition;
condition (2): in the remaining battery placing racks, the number of battery placing racks that meet the first condition is less than the number of battery placing racks that meet the second condition;
condition (3): in the remaining battery placing racks, the number of battery placing racks that meet the first condition is less than the number of battery placing racks that meet the second condition, and the absolute value of the difference value between the two is less than a first difference value threshold;
condition (4): in the remaining battery placing racks, the number of battery placing racks that meet the first condition is less than a first number threshold.

Fourth, in order to maintain the number of the battery placing rack that meets the first condition and the battery placing rack that meets the second condition in balance, select any of the following conditions as a necessary condition of using the multi-function battery placing rack as the second battery placing rack:
condition (1): none of the remaining battery placing racks meet the second condition;
condition (2): in the remaining battery placing racks, the number of battery placing racks that meet the second condition is less than the number of battery placing racks that meet the first condition;
condition (3): in the remaining battery placing racks, the number of battery placing racks that meet the second condition is less than the number of battery placing racks that meet the first condition, and the absolute value of the difference value between the two is less than a second difference value threshold;
condition (4): in the remaining battery placing racks, the number of battery placing racks that meet the second condition is less than a second number threshold.

Embodiment 29

A battery swapping control method in this embodiment involves a further improvement based on embodiment 25 and is mainly reflected in the configuration of the battery swapping device for battery installation in step 23' and the configuration of the battery swapping device for battery removal in step 24'.

The battery swapping device is generally divided into two kinds:
a single-function battery swapping with a single structure may comprise a first structure and is only able to be configured as a battery swapping device for battery installation, or comprise a second structure and is only able to be configured as a battery swapping device for battery removal;
a multi-function battery swapping device with a complex structure may comprise both the first structure and the second structure, and is able to be configured as any of the battery swapping device for battery installation and the battery swapping device for battery removal.

Wherein, the first structure comprises a structure that completes the removal of a battery to be installed from the first battery placing rack and the installation of the battery into the electric vehicle. For example, a grab mechanism for the removal of a battery to be installed from the first battery placing rack, a lifting mechanism for the installation of the battery into the electric vehicle and the like.

The second structure comprises a structure that completes the removal of an undercharged battery from the electric vehicle and the placement of the battery onto the second battery placing rack. For example, a release mechanism for the removal of a battery to be installed from the electric vehicle, a placing mechanism for the placement of the battery into the second battery placing rack and the like.

In the battery swapping control method of this embodiment, both the at least two battery swapping device may be single-function battery swapping devices (however, both a single-function battery swapping device with the first structure and a single-function battery swapping device with the second structure are required); or, both may be multi-function battery swapping devices; or, some may be single-function battery swapping devices, and some may be multi-function battery swapping devices.

To reduce the move distance and time of the battery swapping device for battery installation, and promote the efficient of battery swapping, the nearest battery swapping device to the first battery placing rack is preferably selected to be configured as the battery swapping device for battery installation in step 23'. Specifically, step 23' is performed after the selection of the first battery placing rack of step 21', which step 23' may comprises: determining the location of the first battery placing rack, screening the single-function and multi-function battery swapping devices with the first structure, calculating the distances from each single-function battery swapping device and multi-function battery swapping device with the first structure to the first battery placing rack respectively, and selecting the nearest battery swapping device to configure it as the battery swapping device for battery installation.

To reduce the move distance and time of the battery swapping device for battery installation, and promote the efficient of battery swapping, the nearest battery swapping device to the electric vehicle is preferably selected to be configured as the battery swapping device for battery removal in step 24' (the nearest battery swapping device to the vehicle carrying platform for parking the electric vehicle is preferably selected if the electric vehicle has not been parked). Specifically, step 24' may comprises: screening the single-function and multi-function battery swapping devices with the second structure, calculating the distances from each single-function battery swapping device and multi-function battery swapping device with the second structure to the electric vehicle respectively (calculating the distances from the screened battery swapping devices to the vehicle carrying platform if the electric vehicle has not been parked), and selecting the nearest battery swapping device to configure it as the battery swapping device for battery removal.

In other embodiments, each of the battery placing racks has a predetermined binding relationship with at least one of the battery swapping devices for the purpose of facilitating the management and distribution of battery swapping devices, that is, each battery may only be removed and placed by a battery swapping device bound to the battery.

In the configuration of the battery swapping device for battery installation in step 23', a battery swapping device having a binding relationship with the first battery placing rack or a battery swapping device having a binding relationship with the first battery placing rack and nearest to the first battery placing rack is preferably selected to be configured as the battery swapping device for battery installation. Specifically, step 23' may comprises: after the first placing rack is selected, screening the single-function and multi-function battery swapping devices with the first structure that have the binding relationships with the first battery placing rack, and selecting one from them to configured it as the battery swapping device for battery installation, or further determining the location of the first battery placing rack, calculating the distances from the screened battery swapping device to the first battery placing rack respectively, and select the nearest battery swapping device to configure it as the battery swapping device for battery installation.

In the configuration of the battery swapping device for battery removal in step 24', a battery swapping device having a binding relationship with the second battery placing rack is preferably selected to be configured as the battery swapping device for battery removal (a battery swapping device having a binding relationship with the second battery placing rack and nearest to the first battery placing rack is preferably selected if the electric vehicle has not been parked). Specifically, step 24' may comprises: after the second placing rack is selected, screening the single-function and multi-function battery swapping devices with the second structure that have the binding relationships with the second battery placing rack, and selecting one from them to configured it as the battery swapping device for battery removal, or further calculating the distances from the screened battery swapping devices to the second battery placing rack respectively (calculating the distances of the screened battery swapping devices to the vehicle carrying platform if the electric vehicle has not been parked), and selecting the nearest battery swapping device to configure it as the battery swapping device for battery removal.

Embodiment 30

Figure 11:
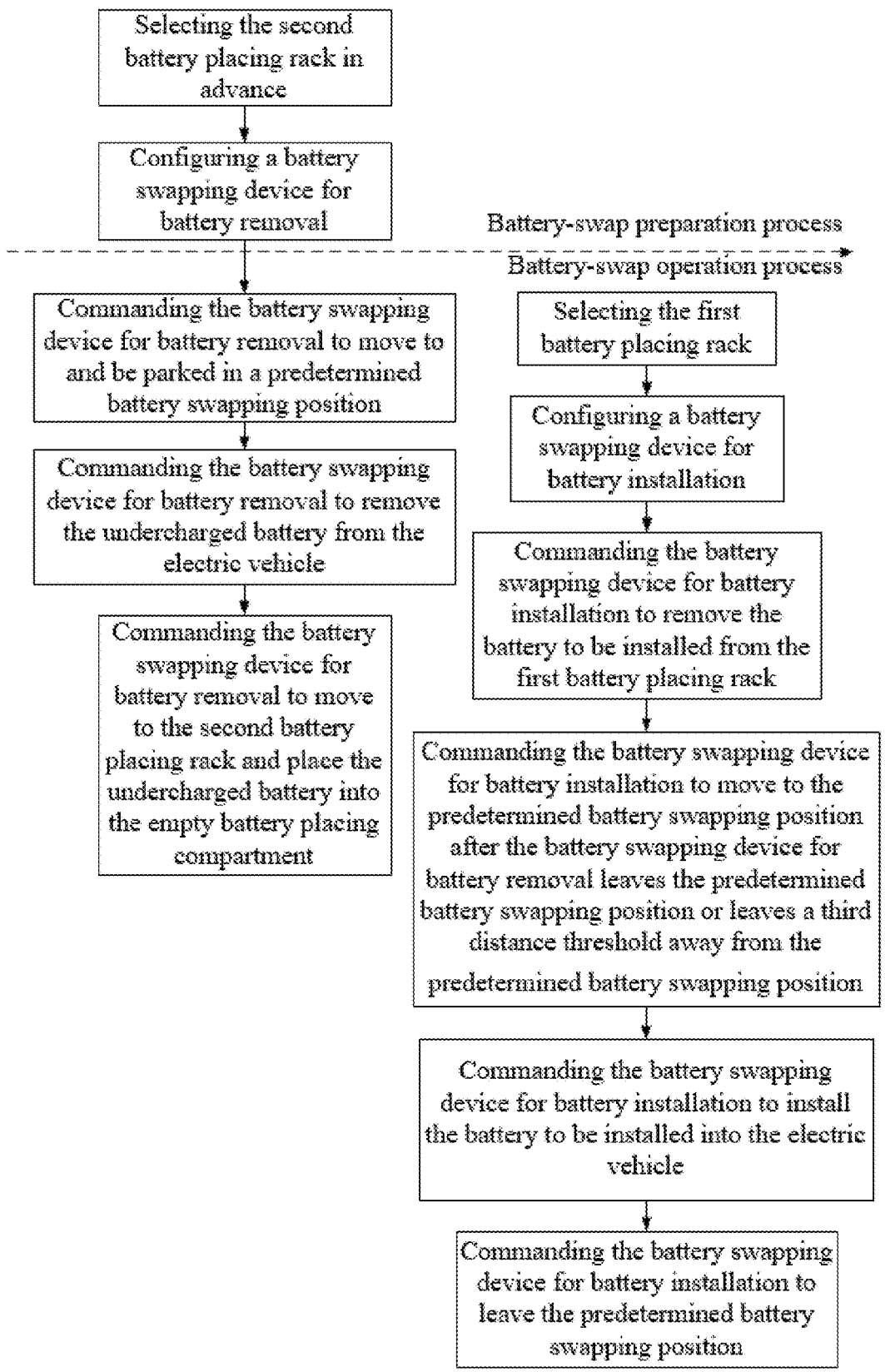
FIG. 11 is a flow diagram of a battery swapping control method according to embodiment 30 in the present disclosure.

A battery swapping control method in this embodiment involves a further improvement based on embodiment 25 and is mainly reflected in the battery swapping control process of the battery swapping control method. As shown in FIG. 11, the battery swapping control process is divided into a battery-swap preparation process before an electric vehicle is parked on the vehicle carrying platform and a battery-swap operation process after an electric vehicle is parked on the vehicle carrying platform in this embodiment.

In the battery-swap preparation process, the battery swapping control method comprises: selecting the second battery placing rack in advance, and then configuring a battery swapping device for battery removal. The selection process of the second battery placing rack can be seen in embodiments 26-28, and the method of configuring the battery swapping device for battery removal can be seen in embodiment 29, wherein.

In the battery-swap operation process, the battery swapping control method comprises: commanding the battery swapping device for battery removal to move to and be parked in a predetermined battery swapping position.

After the electric vehicle is parked on the vehicle carrying platform and the battery swapping device for battery removal is parked in the predetermined battery swapping position, the battery swapping device for battery removal is commanded to remove the undercharged battery from the electric vehicle.

In the embodiment, the predetermined battery swapping position refers to a position suitable for battery removal from the electric vehicle parked on the vehicle carrying platform. This could be understood as that the battery is removed from an electric vehicle parked on the vehicle carrying platform with the minimum action by the battery swapping device for battery removal when the battery swapping device for battery removal is located in the predetermined battery swapping position. The predetermined battery swapping position is located below or above the vehicle carrying platform, which the location of the predetermined battery swapping position can specifically depend on the structure of the vehicle carrying platform (the detailed description of the predetermined battery swapping position please see in embodiment 25).

The predetermined battery swapping position may be set based on the structure of the vehicle carrying platform, and further be set combined with the second structure of the battery swapping device for battery removal and the conditions including the movement path of the second structure of the removal of an undercharged battery.

After the removal of the undercharged battery from the electric vehicle by the battery swapping device for battery removal, the battery swapping device is commanded to move to the second battery placing rack and place the undercharged battery into the empty battery placing compartment.

In the battery-swap operation process, the battery swapping control method also comprises: selecting the first battery placing rack, then configuring the battery swapping device for battery installation, and commanding the battery swapping device for battery installation to obtain the battery to be installed form the first battery placing rack. The selection process of the first battery placing rack can be seen in embodiments 26-28, and the method of configuring the battery swapping device for battery installation can be seen in embodiment 29, wherein.

After the battery swapping device for battery removal leaves the predetermined battery swapping position or leaves a third distance threshold away from the predetermined battery swapping position, the battery swapping device for battery installation is commanded to move to the predetermined battery swapping position.

After the battery swapping device for battery installation has moved to the predetermined battery swapping position, the battery swapping device for battery installation is commanded to install the battery to be installed into the electric vehicle. At this point, the battery swapping of the electric vehicle is completed.

Finally, the battery swapping device for battery installation is commanded to leave the predetermined battery swapping position.

Embodiment 31

Figure 12:
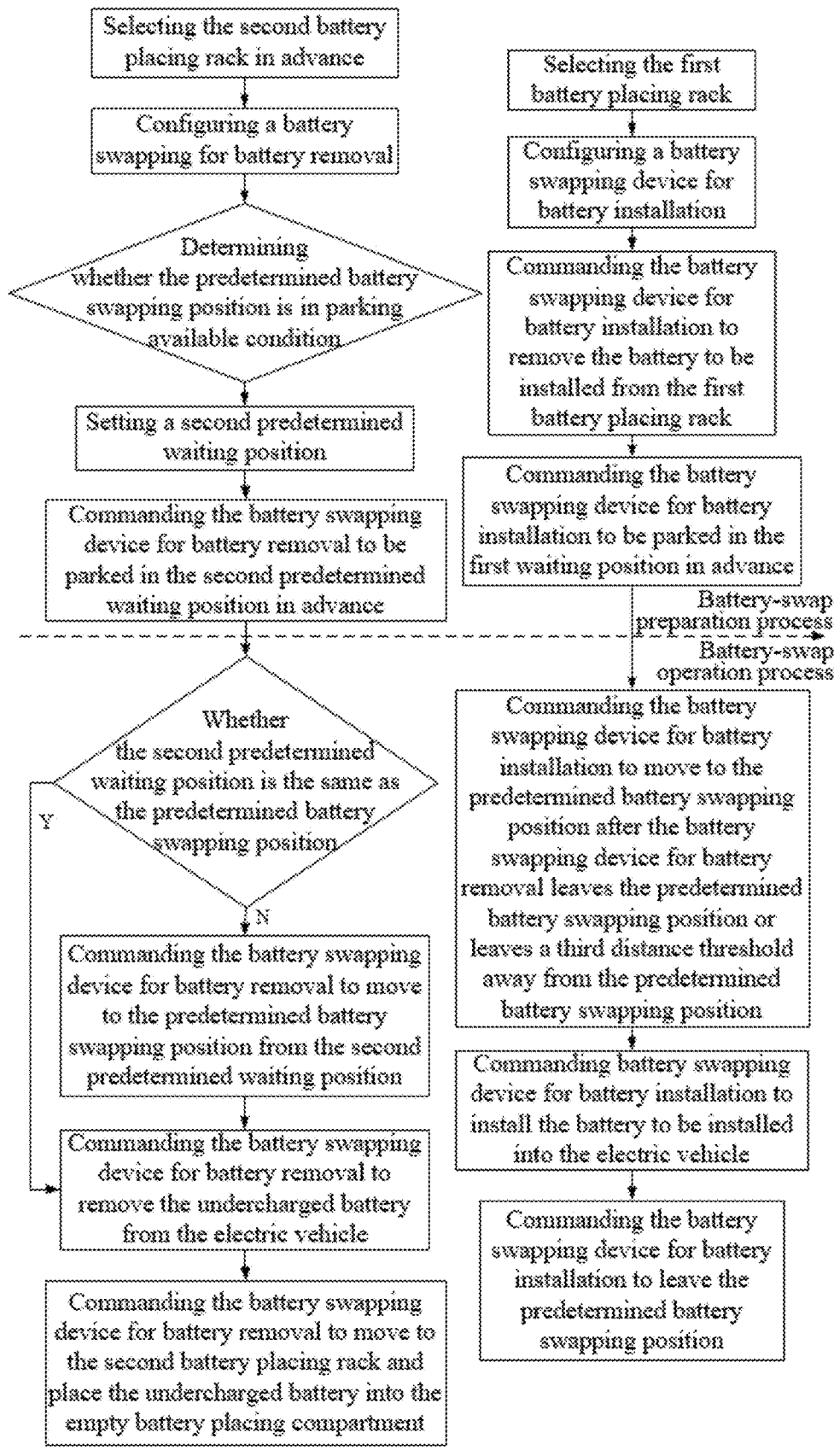
FIG. 12 is a flow diagram of a battery swapping control method according to embodiment 31 in the present disclosure.

A battery swapping control method in this embodiment involves a further improvement based on embodiment 25 and is mainly reflected in the battery swapping control process of the battery swapping control method. In the embodiment, the battery swapping control process is divided into a battery-swap preparation process before an electric vehicle is parked on the vehicle carrying platform and a battery-swap operation process after an electric vehicle is parked on the vehicle carrying platform. As shown in FIG. 12, in the battery-swap preparation process and the battery-swap operation process, the steps involved in the battery swapping control method are different from those in embodiment 30.

In the battery-swap preparation process, the battery swapping control method comprises: selecting the second battery placing rack, configuring the battery swapping device for battery removal, and controlling the battery swapping device for battery removal to complete part operations in advance, such that the time of battery removal is reduced. The selection process of the second battery placing rack can be seen in embodiments 26-28, and the configuration process of the battery swapping device for battery removal can be seen in embodiment 29, wherein.

Wherein commanding the battery swapping device for battery removal to complete part operations comprises: determining whether the predetermined battery swapping position is in parking available condition so as to set a second predetermined waiting position, and then commanding the battery swapping device for battery removal to be parked in the second predetermined waiting position in advance, wherein the second predetermined waiting position is related to the predetermined battery swapping position, and may be the same as or near the predetermined battery swapping position (the description of the predetermined battery swapping position please see in embodiment 30).

The determination of whether the predetermined battery swapping position is in parking available condition may specifically comprises:

the predetermined battery swapping position is in parking available condition as all the following conditions are satisfied, otherwise, the predetermined battery swapping position is in parking non-available condition:

condition (1): the predetermined battery swapping position is an empty space;

condition (2): existing an access for the battery swapping device for battery removal 12B to move to the predetermined battery swapping position;

condition (3): it is predicted that the battery swapping device for battery removal 12B does not obstruct an electric vehicle moving to the vehicle carrying platform when the battery swapping device is parked in the predetermined battery swapping position.

Whether condition (3) is met may typically depend on the structure of the vehicle carrying platform.

The second predetermined waiting position is the same as the predetermined battery swapping position when the predetermined battery swapping position is in parking available condition. The second predetermined waiting position refers to a position within a second distance threshold from the predetermined battery swapping position, i.e. a position near the predetermined battery swapping position, when the predetermined battery swapping position is in parking non-available condition.

In this embodiment, if the battery model suitable for the electric vehicle is predictable before the electric vehicle is parked on the vehicle carrying platform, the battery swapping control method also comprises, in the battery-swap preparation: selecting the first battery placing rack, configuring the battery swapping device for battery installation, and controlling the battery swapping device for battery installation to complete part operations in advance, such that the time of battery removal is reduced. The selection process of the second battery placing rack can be seen in embodiments 26-28, and the configuration process of the battery swapping device for battery removal can be seen in embodiment 29, wherein. Moreover, the battery model suitable for the electric vehicle may be known beforehand by the following way: the vehicle carrying platform is only provided for parking an electric vehicle suitable for the battery of the model. For example, a vehicle carrying platform is predetermined that limited to park an electric vehicle with a specific model of a battery, it can thus be determined that the battery model suitable for the electric vehicle has to be the specific model no matter whether the electric vehicle is already parked on the vehicle carrying platform.

Wherein commanding the battery swapping device for battery installation to complete part control comprises: commanding the battery swapping device for battery installation to obtain the battery to be installed from the first battery placing rack.

After the battery to be installed is obtained from the first battery placing rack by the battery swapping device for battery installation, the battery swapping device for battery installation is commanded to be parked in the first predetermined waiting position in advance, which the first predetermined waiting position refers to a position near the vehicle carrying platform and within a first distance threshold from the vehicle carrying platform.

At this point, the battery swapping of the electric vehicle is completed, and the battery swapping control system waits for the electric vehicle to enter and park on the vehicle carrying platform to proceed to the battery-swap operation process.

In the battery-swap operation process, the battery swapping control method comprises: determining whether the second predetermined waiting position of the battery swapping device for battery removal is the same as the predetermined battery swapping position:

if so, commanding the battery swapping device for battery removal to remove the undercharged battery from the electric vehicle;

if not, commanding the battery swapping device for battery removal to move to the predetermined battery swapping position from the predetermined waiting position; and then, commanding the battery swapping device for battery removal to remove the undercharged battery from the electric vehicle.

After the battery removal instruction has been executed by the battery swapping device for battery removal, the battery swapping device for battery removal is commanded to move to the second battery placing rack and place the undercharged battery into the empty battery compartment.

After the battery swapping device for battery removal leaves the predetermined battery swapping position or leaves a third distance threshold away from the predetermined battery swapping position, the battery swapping device for battery installation is commanded to move to the predetermined battery swapping position.

After the battery swapping device for battery installation has moved to the predetermined battery swapping position, the battery swapping device for battery installation is commanded to install the battery to be installed into the electric vehicle. At this point, the battery swapping of the electric vehicle is completed.

The battery swapping device for battery installation is commanded to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Embodiment 32

Figure 13:
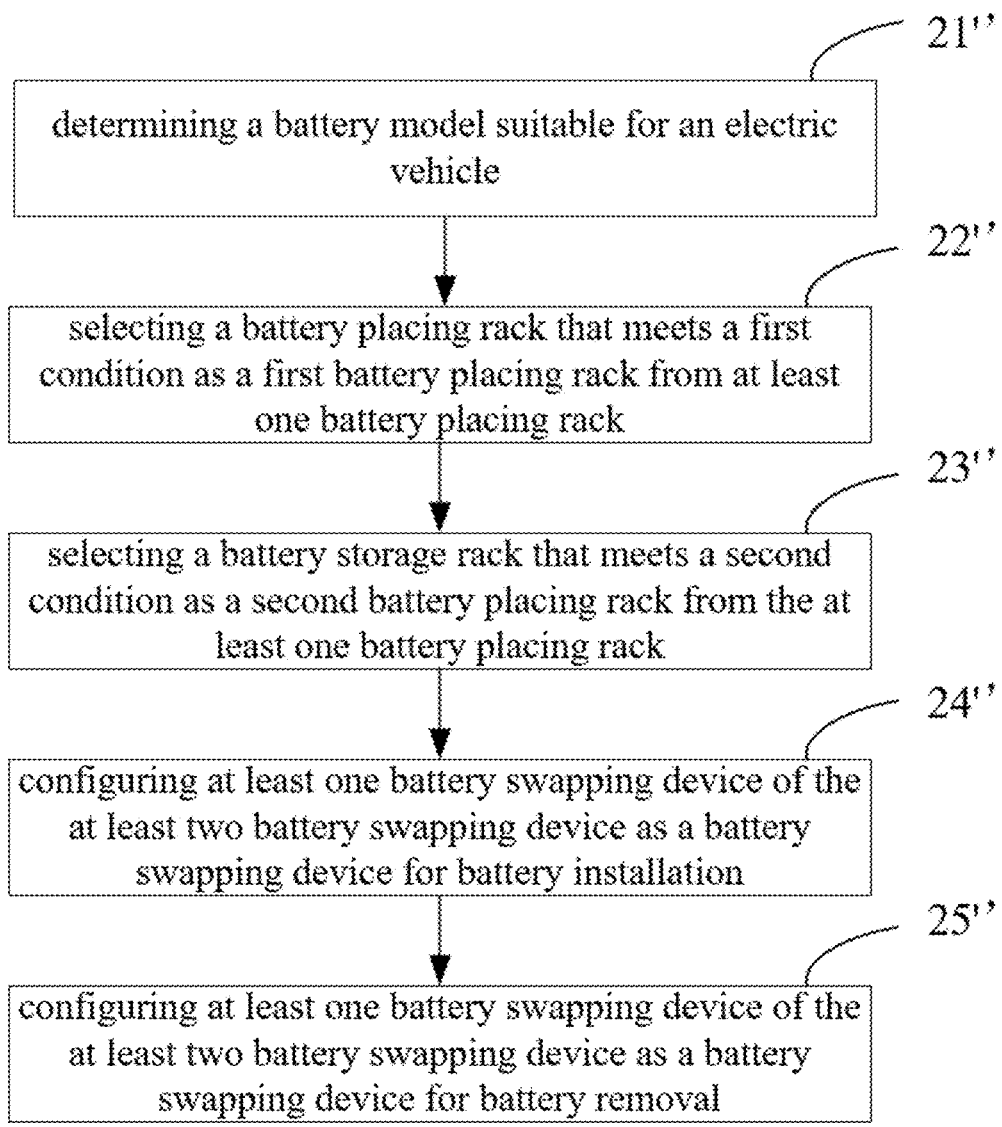
FIG. 13 is a flow diagram of a battery swapping control method according to embodiment 32 in the present disclosure.

A battery swapping control method in this embodiment is shown in FIG. 13. The battery swapping control method comprises:

step 21'. determining a battery model suitable for an electric vehicle to be battery-swapped;

step 22'. selecting a battery placing rack that meets a first condition as a first battery placing rack from at least one battery placing rack, wherein the battery placing racks have several battery placing compartments for battery placement, and the first condition is set to have a battery with the battery model;

step 23'. selecting a battery placing rack that meets a second condition as a second battery placing rack from the at least one battery placing rack, wherein the second condition is set to have an empty battery placing compartment;

step 24'. configuring at least one battery swapping device of the at least two battery swapping device as a battery swapping device for battery installation, wherein the battery swapping device for battery installation is configured to transfer a battery to be installed, which the battery to be installed is a battery obtained from the first battery placing rack with the battery model and will be installed into the electric vehicle;

step 25'. configuring at least one battery swapping device of the at least two battery swapping device as a battery swapping device for battery removal, wherein the battery swapping device for battery removal is configured to transfer an undercharged battery, which is a battery that removed from the electric vehicle and will be placed in the empty battery compartment.

The above sequence of the steps is only a possible sequence of each of the steps above, in other embodiments, each of the steps above may adopt to other sequences, for example, perform step 23' first, and then follow steps 25', 21', 23' and 24' in turn, or, perform step 21' first, and then follow steps 22', 24', 23' and 25' in turn.

In this embodiment, the determination of a battery model suitable for the electric vehicle is convenient for the selection of the first battery placing rack and the obtaining of the battery to be installed; two battery swapping devices are used during the entire process of the battery swapping for a vehicle, which are the battery swapping device for battery installation and the battery swapping device for battery removal. The moving track of the battery swapping device for battery installation is between the first battery placing rack and the electric vehicle to transport the battery to be installed, and the moving track of the battery swapping device for battery removal is between the electric vehicle and the second battery placing rack to transport the undercharged battery. The two battery swapping devices work with separate responsibilities to accomplish the battery swapping task together, which enables the whole battery swapping time is reduced to be at least half of that only one battery swapping device is used and improves the speed and efficiency of battery swapping, thereby.

Embodiment 33

A battery swapping control method in this embodiment involves a further improvement based on embodiment 32. The improvement in this embodiment based on embodiment 32 is substantially the same as the improvement in embodiment 26 based on embodiment 25. The difference is that the first condition may be set to a have a fully charged battery suitable for the electric vehicle;

or, to improve the in order to promote the probability of being able to swap a battery of the electric vehicle, the first condition may be preferably set to have a fully charged battery with the battery model, and if none of the battery placing racks meets the first condition, the first condition is modified as having a battery of the battery model with the highest power. Similarly, step 22' specifically comprises: the first condition is set by default to have a fully charged battery with the battery model, and determining whether the at least one battery placing rack comprises a battery placing rack that meets the default first condition, and if so, select one as the first battery placing rack 13A from the at least one battery placing rack, if not:

modifying the first condition as having a battery of the battery model with the highest power, and then determining whether the at least one battery placing rack comprises a battery placing rack that meets the current first condition again and if so, select one as the first battery placing rack from the at least one battery placing rack. If there is still no battery placing rack meets the first condition, send out an alarm signal to indicate that the battery swapping of the electric vehicle is unavailable.

Embodiment 34

A battery swapping control method in this embodiment involves a further improvement based on embodiments 32 or 33. The improvement of this embodiment based on embodiments 32 or 33 is substantially the same as that of embodiment 27 based on embodiments 25 or 26, and the difference is that, the battery placing rack closest to the electric vehicle or the battery placing rack closest to a vehicle carrying platform for parking the electric vehicle is selected from battery placing racks that meet the first condition as the first battery placing rack, such that the move distance and time of the battery swapping device are reduced, and battery swapping efficiency is increased.

Similarly, the battery placing rack closest to the electric vehicle or the battery placing rack closest to a vehicle carrying platform for parking the electric vehicle is selected from battery placing racks that meet the second condition as the second battery placing rack, such that the move distance and time of the battery swapping device are reduced, and battery swapping efficiency is increased Moreover, the vehicle carrying platform may be a special platform for battery swapping or other common parking-available platforms that are convenient for battery swapping in this embodiment.

Embodiment 35

A battery swapping control method in this embodiment involves a further improvement based on embodiments 32 or 33. The improvement in this embodiment based on embodiments 32 or 33 please refer to the improvement in embodiment 27 based on embodiments 25 or 26.

Embodiment 36

A battery swapping control method in this embodiment involves a further improvement based on embodiment 32. The improvement of this embodiment based on embodiment 32 is substantially the same as that of embodiment 29 based on embodiment 25, and the difference is that, in this embodiment, to reduce the move distance and time of the battery swapping device for battery installation and promote the efficient of battery swapping, the nearest battery swapping device to the electric vehicle or the nearest battery swapping device to the vehicle carrying platform for parking the electric vehicle is preferably selected to be configured as the battery swapping device for battery installation in step 25'. Specifically, step 25' may comprise: screening the single-function and multi-function battery swapping devices with the second structure, calculating the distances from each single-function battery swapping device and multi-function battery swapping device with the second structure to the electric vehicle or the vehicle carrying platform respectively, and selecting the nearest battery swapping device to configure it as the battery swapping device for battery removal.

In the configuration of the battery swapping device for battery removal of step 25', a battery swapping device having a binding relationship with the second battery placing rack, or a battery swapping device having a binding relationship with the second battery placing rack and nearest to the vehicle carrying platform rack for parking the electric vehicle, is preferably selected. Specifically, step 25' may comprises: after the second placing rack is selected, screening the single-function and multi-function battery swapping devices with the second structure that have the binding relationships with the second battery placing rack, and selecting one from them to configured it as the battery swapping device for battery removal randomly, or further calculating the distances from the screened battery swapping devices to the electric vehicle or the vehicle carrying platform respectively, and selecting the nearest battery swapping device to configure it as the battery swapping device for battery removal.

Embodiment 37

Figure 14:
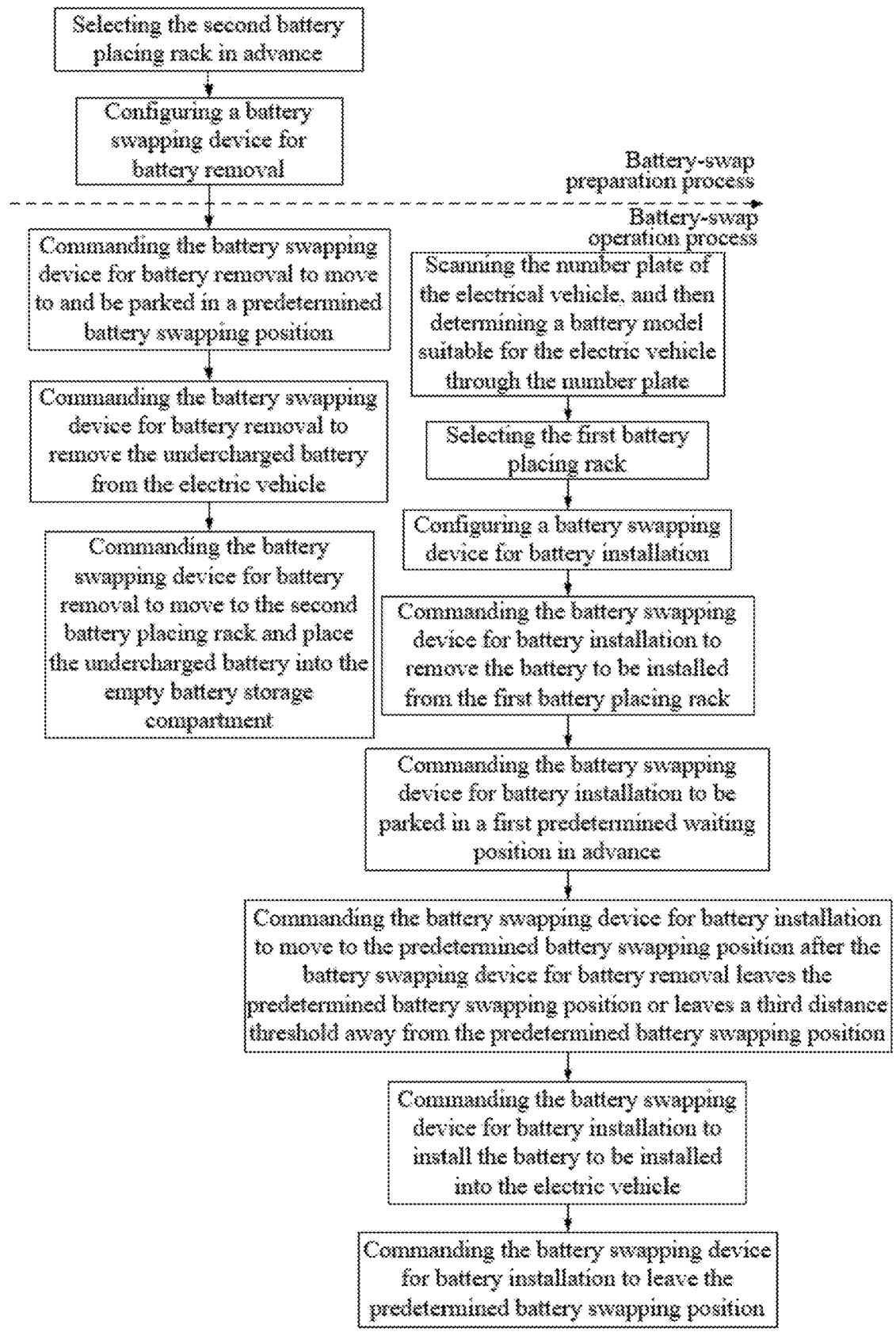
FIG. 14 is a flow diagram of a battery swapping control method according to embodiment 37 in the present disclosure.

A battery swapping control method in this embodiment involves a further improvement based on embodiment 32. The improvement of this embodiment based on embodiment 32 is substantially the same as that of embodiment 30 based on embodiment 25, and the difference is that, in this embodiment, the battery swapping control process is divided into a battery-swap preparation process before an electric vehicle is parked on the vehicle carrying platform and a battery-swap operation process after an electric vehicle is parked on the vehicle carrying platform as shown in FIG. 14.

In the battery-swap preparation process, the battery swapping control method comprises: selecting the second battery placing rack in advance and configuring a battery swapping device for battery removal, wherein the selection method of the second battery placing rack can be seen in embodiment 33-35 and the configuration method of the battery swapping device for battery removal can be seen in embodiment 36.

In this embodiment, see embodiment 30 for the detailed description of the predetermined battery swapping position.

In the battery-swap operation process, the battery swapping control method also comprises: scanning the number plate of the electric vehicle after the electric vehicle is parked on the vehicle carrying platform or the number plate of the electric vehicle can be observed, and then determining a battery model suitable for the electric vehicle through the number plate. Furthermore, selecting the first battery placing rack, configuring the battery swapping device for battery installation, and commanding the battery swapping device for battery installation to obtain the battery to be installed from the first battery placing rack. The selection method of the second battery placing rack can be seen in embodiment 33-35 and the configuration method of the battery swapping device for battery installation can be seen in embodiment 36, wherein.

After the battery swapping device for battery installation obtains the battery to be installed from the first battery placing rack, the battery swapping device for battery installation is commanded to be parked a first predetermined waiting position in advance, which the first predetermined waiting position refers to a position within a first distance threshold from the vehicle carrying platform.

After the battery swapping device for battery removal leaves the predetermined battery swapping position or leaves a third distance threshold away from the predetermined battery swapping position, the battery swapping device for battery installation is commanded to move to the predetermined battery swapping position.

After the battery swapping device for battery installation has moved to the predetermined battery swapping position, the battery swapping device for battery installation is commanded to install the battery to be installed into the electric vehicle. At this point, the battery swapping of the electric vehicle is completed.

Finally, the battery swapping device for battery installation is commanded to leave the predetermined battery swapping position.

Embodiment 38

Figure 15:
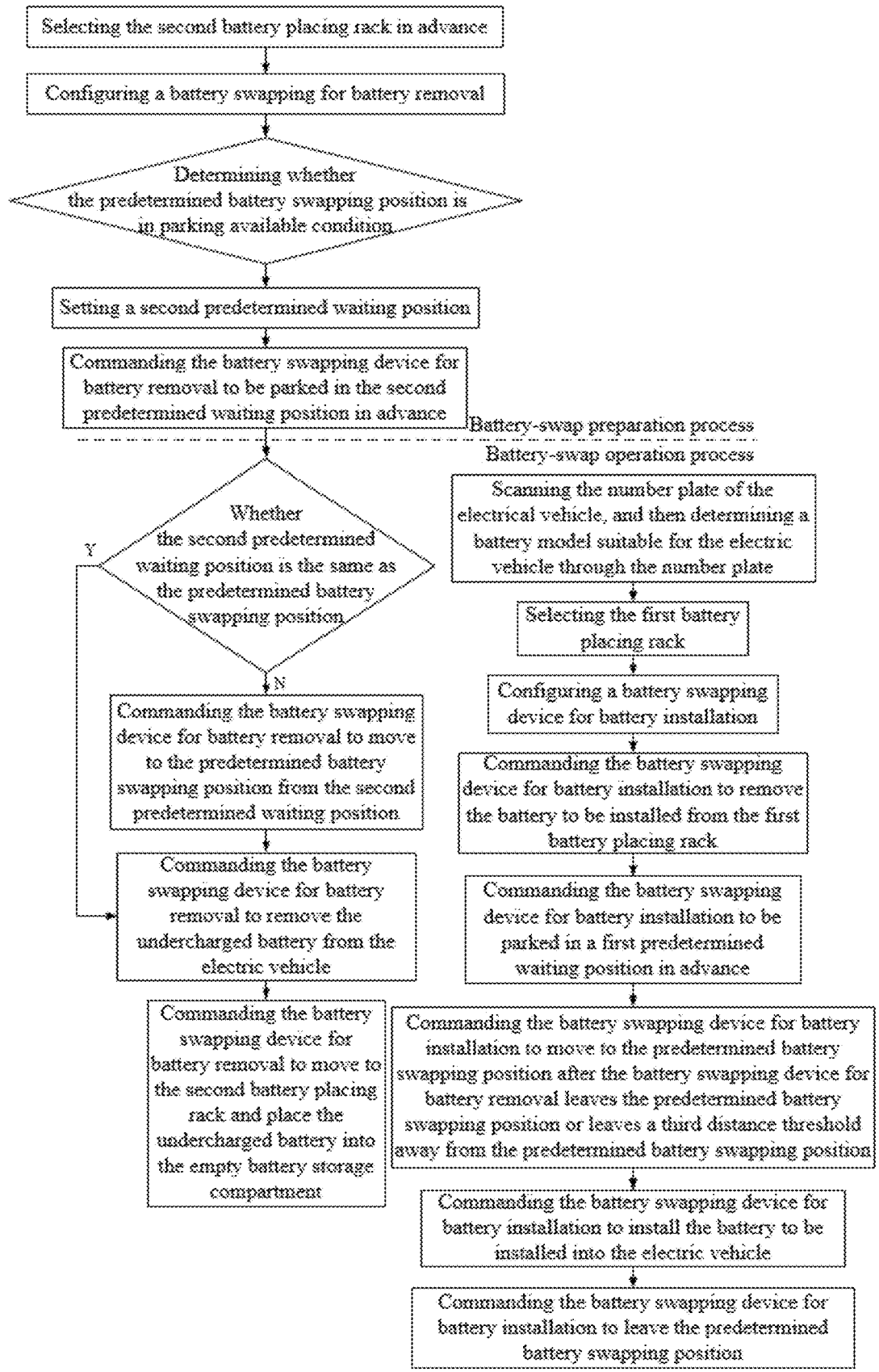
FIG. 15 is a flow diagram of a battery swapping control method according to embodiment 38 in the present disclosure.

A battery swapping control method in this embodiment involves a further improvement based on embodiment 32 and is mainly reflected in the battery swapping control process of the battery swapping control method. In the embodiment, the battery swapping control process is divided into a battery-swap preparation process before an electric vehicle is parked on the vehicle carrying platform and a battery-swap operation process after an electric vehicle is parked on the vehicle carrying platform. As shown in FIG. 15, in the battery-swap preparation process and the battery-swap operation process, the steps involved in the battery swapping control method are different from those in embodiment 37.

In the battery-swap preparation process, the battery swapping control method comprises: selecting the second battery placing rack in advance, configuring a battery swapping device for battery removal, and commanding the battery swapping device for battery removal to complete part control, such that the time of battery removal is reduced. The selection method of the second battery placing rack can be seen in embodiment 33-35 and the configuration method of the battery swapping device for battery removal can be seen in embodiment 36, wherein.

Wherein commanding the battery swapping device for battery removal to complete part control comprises: determining whether the predetermined battery swapping position is in parking available condition so as to set the second predetermined waiting position, and then commanding the battery swapping device for battery removal to be parked in the second predetermined waiting position in advance, wherein the second predetermined waiting position is related to the predetermined battery swapping position, and may be the same as or near the predetermined battery swapping position (the description of the predetermined battery swapping position please see in embodiment 30).

The determination of whether the predetermined battery swapping position is in parking available condition may specifically comprises:
the predetermined battery swapping position is in parking available condition as all the following conditions are satisfied, otherwise, the predetermined battery swapping position is in parking non-available condition:
condition (1): the predetermined battery swapping position is an empty space;
condition (2): existing an access for the battery swapping device for battery removal 12B to move to the predetermined battery swapping position;
condition (3): it is predicted that the battery swapping device for battery removal 12B does not obstruct an electric vehicle moving to the vehicle carrying platform when the battery swapping device is parked in the predetermined battery swapping position.

Whether condition (3) is met may typically depend on the structure of the vehicle carrying platform.

The second predetermined waiting position is the same as the predetermined battery swapping position when the predetermined battery swapping position is in parking available condition, which the second predetermined waiting position refers to a position within a second distance threshold from the predetermined battery swapping position, i.e. a position near the predetermined battery swapping position.

At this point, the battery swapping of the electric vehicle is completed, and the battery swapping control system waits for the electric vehicle to enter and park on the vehicle carrying platform to proceed to the battery-swap operation process.

In the battery-swap operation process, the battery swapping control method comprises: determining whether the second predetermined waiting position of the battery swapping device for battery removal is the same as the predetermined battery swapping position:
if so, commanding the battery swapping device for battery removal to remove the undercharged battery from the electric vehicle;
if not, commanding the battery swapping device for battery removal to move to the predetermined battery swapping position from the predetermined waiting position; and then, commanding the battery swapping device for battery removal to remove the undercharged battery from the electric vehicle.

After the battery removal instruction has been executed by the battery swapping device for battery removal, the battery swapping device for battery removal is commanded to move to the second battery placing rack and place the undercharged battery into the empty battery compartment.

After the battery swapping device for battery removal leaves the predetermined battery swapping position or leaves a third distance threshold away from the predetermined battery swapping position, the battery swapping device for battery installation is commanded to move to the predetermined battery swapping position.

In the battery-swap operation process, the battery swapping control method also comprises: scanning the number plate of the electric vehicle after the electric vehicle is parked on the vehicle carrying platform or the number plate of the electric vehicle can be observed, and then determining a battery model suitable for the electric vehicle through the number plate. Furthermore, selecting the first battery placing rack, configuring the battery swapping device for battery installation, and commanding the battery swapping device for battery installation to obtain the battery to be installed from the first battery placing rack.

After the battery swapping device for battery installation obtains the battery to be installed from the first battery placing rack, the battery swapping device for battery installation is commanded to be parked a first predetermined waiting position in advance, which the first predetermined waiting position refers to a position within a first distance threshold from the vehicle carrying platform.

After the battery swapping device for battery removal leaves the predetermined battery swapping position or leaves a third distance threshold away from the predetermined battery swapping position, the battery swapping device for battery installation is commanded to move to the predetermined battery swapping position.

After the battery swapping device for battery installation has moved to the predetermined battery swapping position, the battery swapping device for battery installation is commanded to install the battery to be installed into the electric vehicle. At this point, the battery swapping of the electric vehicle is completed.

The battery swapping device for battery installation is commanded to leave the predetermined battery swapping position.

In this embodiment, part control is completed during the battery-swap preparation process of the battery swapping control system, which reduces the battery swapping time following the entering of the electric vehicle onto the vehicle carrying platform and promotes the battery-swap efficiency significantly.

Although the specific embodiments of the present disclosure are described above, those skilled in the art should understand that these are only examples, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

What is claimed is:

1. A battery swapping control system, comprising: a control unit and a battery swapping device;
    the control unit is configured to determine a battery model suitable for an electric vehicle;
    the control unit is further configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery with the battery model, and the second condition is set to have an empty battery placing compartment;
    the battery swapping device is configured for moving to a predetermined battery swapping position to remove an undercharged battery from the electric vehicle, transfer the undercharged battery to the second battery placing rack, and place it in the empty battery compartment, and then moving to the first battery placing rack to obtain a battery with the battery model from the first battery placing rack, transfer the battery with the battery model to the predetermined battery swapping position, and install it in the electric vehicle, wherein the predetermined battery swapping position refers to a position suitable for the removal and installation of batteries from/into the electric vehicle;
    the battery swapping device is controlled by the control unit;
    the control unit sends the following instruction to the battery swapping device, and the instruction is executed by the battery swapping device before the electrical vehicle is parked on a vehicle carrying platform:
    a parking instruction for commanding the battery swapping device to be parked in a predetermined waiting position in advance;
    the predetermined waiting position is the same as the predetermined battery swapping position when the predetermined battery swapping position is in parking available condition; or,
    the predetermined waiting position refers to a position within a first distance threshold from the predetermined battery swapping position when the predetermined battery swapping position is in parking non-available condition;
    the control unit is further configured to send a fine-tuning instruction to the battery swapping device for battery removal after the electric vehicle is parked on the vehicle carrying platform, which the fine-tuning instruction is configured to command the battery swapping device to move to the predetermined battery swapping position from the predetermined waiting position;
    the predetermined battery swapping position is in parking available condition as all the following conditions are satisfied, otherwise, the predetermined battery swapping position is in parking non-available condition:
    the predetermined battery swapping position is an empty space;
    existing an access for the battery swapping device to move to the predetermined battery swapping position;
    it is predicted that the battery swapping device does not obstruct an electric vehicle moving to the vehicle carrying platform when the battery swapping device is parked in the predetermined battery swapping position.

2. The battery swapping control system of claim 1, wherein the control unit is further configured to monitor the level of batteries placed on the battery placing racks;
    the first condition is set to have a fully charged battery with the battery model;
    or, the first condition is preferably set to have a fully charged battery with the battery model, and if none of the at least one battery placing rack meet the first condition, the first condition is modified to be having a battery of the battery model with the highest power.

3. The battery swapping control system of claim 2, wherein the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack, or select one battery placing rack located on a path between the second battery placing rack and the electric vehicle as the first battery placing rack, or select the battery placing rack closest to the electric vehicle or the battery placing rack closest to the vehicle carrying platform as the first battery placing rack, wherein the battery placing rack is located on the path;
    and/or, the control unit is further configured to select a battery placing rack randomly as the second placing rack from battery placing racks that meet the second condition when more than one battery placing rack meets the second condition, or select the battery placing rack closest to the electric vehicle or the battery placing rack closest to the vehicle carrying platform as the second battery placing rack.

4. The battery swapping control system of claim 3, wherein the battery placing racks are disposed on both sides of the vehicle carrying platform along the direction which the electric vehicle is entering.

5. The battery swapping control system of claim 1, wherein the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack, or select one battery placing rack located on a path between the second battery placing rack and the electric vehicle as the first battery placing rack, or select the battery placing rack closest to the electric vehicle or the battery placing rack closest to the vehicle carrying platform as the first battery placing rack, wherein the battery placing rack is located on the path;

and/or, the control unit is further configured to select a battery placing rack randomly as the second placing rack from battery placing racks that meet the second condition when more than one battery placing rack meets the second condition, or select the battery placing rack closest to the electric vehicle or the battery placing rack closest to the vehicle carrying platform as the second battery placing rack.

6. The battery swapping control system of claim 5, wherein the battery placing racks are disposed on both sides of the vehicle carrying platform along the direction which the electric vehicle is entering.

7. The battery swapping control system of claim 1, wherein if the at least one battery placing rack comprises a multi-function battery placing rack that meets both the first condition and the second condition, the control unit is further configured to:

use the multi-function battery placing rack as both the first battery placing rack and the second battery placing rack simultaneously.

8. The battery swapping control system of claim 1, wherein the empty battery placing compartment is further configured to charge the undercharged battery;

the empty battery placing compartment comprises a battery charging circuit;

the battery charging circuit involves constant electrical parameters that matches the battery model;

or, the battery charging circuit involves adjustable electrical parameters, and the control unit is further configured to adjust the electrical parameters based on the battery model such that the electrical parameters match the battery model.

9. The battery swapping control system of claim 1, wherein the control unit is further configured to scan the number plate of the electrical vehicle, and then determine the battery model suitable for the electric vehicle through the number plate.

10. The battery swapping control system of claim 1, wherein the predetermined battery swapping position is located below or above the vehicle carrying platform, which the location of the predetermined battery swapping position depends on the structure of the vehicle carrying platform.

11. The battery swapping control system of claim 1, wherein the battery swapping device is controlled by the control unit;

the control unit is further configured to send the following instructions to the battery swapping device after the electric vehicle is parked on a vehicle carrying platform, and the instructions are executed by the battery swapping device:

a battery removal instruction for commanding the battery swapping device to remove the undercharged battery from the electric vehicle;

a first move instruction for commanding the battery swapping device to move to the second battery placing rack;

a battery placement instruction for commanding the battery swapping device to place the undercharged battery into the empty battery compartment;

a second move instruction for commanding the battery swapping device to move to the first battery placing rack;

a battery obtainment instruction for commanding the battery swapping device to obtain the battery with the battery model from the first battery placing rack;

a third move instruction for commanding the battery swapping device to move to the predetermined battery swapping position;

a battery installation instruction for commanding the battery swapping device to install the battery with the battery model into the electric vehicle.

12. A battery swapping control system, comprising: a control unit and at least two battery swapping devices;

the control unit is configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery suitable for an electric vehicle, and the second condition is set to have an empty battery placing compartment;

the control unit is further configured to configure at least one battery swapping device of the at least two battery swapping devices as a battery swapping device for battery installation, and configure at least one battery swapping device of the at least two battery swapping devices as a battery swapping device for battery removal;

the battery swapping device for battery installation is configured to transfer a battery to be installed, which the battery is obtained from the first battery placing rack and suitable for the electric vehicle, and will be installed into the electric vehicle;

the battery swapping device for battery removal is configured to transfer an undercharged battery, which is a battery that removed from the electric vehicle and will be placed in the empty battery compartment;

the control unit is further configured to send a second move instruction to the battery swapping device for battery removal before the electric vehicle is parked on a vehicle carrying platform, which the second move instruction is configured to command the battery swapping device for battery removal to be parked in a second predetermined waiting position in advance; the battery swapping device for battery removal is further configured to execute the second move instruction;

the second predetermined waiting position is the same as the predetermined battery swapping position when the predetermined battery swapping position is in parking available condition, which the predetermined battery swapping position refers to a position suitable for battery removal from the electric vehicle parked on the vehicle carrying platform;

the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;

the control unit is further configured to send a fine-tuning instruction to the battery swapping device for battery removal after the electric vehicle is parked on the vehicle carrying platform, which the fine-tuning instruction is configured to command the battery swapping device for battery removal to move to the predetermined battery swapping position from the second predetermined waiting position;

the predetermined battery swapping position is in parking available condition as all the following conditions are satisfied, otherwise, the predetermined battery swapping position is in parking non-available condition:

the predetermined battery swapping position is an empty space;

existing an access for the battery swapping device for battery removal to move to the predetermined battery swapping position;

it is predicted that the battery swapping device for battery removal does not obstruct an electric vehicle moving to the vehicle carrying platform when the battery swapping device for battery removal is parked in the predetermined battery swapping position.

13. The battery swapping control system of claim 12, wherein the control unit is further configured to monitor the level of batteries placed on the battery placing rack;

the first condition is set to have a fully charged battery suitable for the electric vehicle;

or, the first condition is preferably set to have a fully charged battery suitable for the electric vehicle, and if the at least one battery placing rack does not involve a battery rack that meets the first condition, the first condition is modified to be having a battery suitable for the electric vehicle with the highest power.

14. The battery swapping control system of claim 13, wherein the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack;

and/or, the control unit is further configured to select one battery placing rack randomly as the second placing rack from battery placing racks that meet the second condition when more than one battery placing rack meets the second condition, or select the battery placing rack closest to the electric vehicle or the battery placing rack closest to a vehicle carrying platform for parking the electric vehicle as the second battery placing rack.

15. A battery swapping control system, comprising: a control unit and at least two battery swapping devices;

the control unit is configured to determine a battery model suitable for an electric vehicle to be battery-swapped;

the control unit is further configured to select a battery placing rack that meets a first condition as a first battery placing rack from at least one battery placing rack, and select a battery placing rack that meets a second condition as a second battery placing rack from the at least one battery placing rack, which the battery placing racks have several battery placing compartments for battery placement, the first condition is set to have a battery with the battery model, and the second condition is set to have an empty battery placing compartment;

the control unit is further configured to configure at least one battery swapping device of the at least two battery swapping device as a battery swapping device for battery installation, and configure at least one battery swapping device of the at least two battery swapping device as a battery swapping device for battery removal;

the battery swapping device for battery installation is configured to transfer a battery to be installed, which is a battery with the battery model that obtained from the first battery placing rack, and the battery will be installed into the electric vehicle;

the battery swapping device for battery removal is configured to transfer an undercharged battery, which is a battery that removed from the electric vehicle and will be placed in the empty battery compartment;

the control unit is further configured to send a second move instruction to the battery swapping device for battery removal before the electric vehicle is parked on a vehicle carrying platform, which the second move instruction is configured to command the battery swapping device for battery removal to be parked in a second predetermined waiting position in advance: the battery swapping device for battery removal is further configured to execute the second move instruction;

the second predetermined waiting position is the same as the predetermined battery swapping position when the predetermined battery swapping position is in parking available condition, which the predetermined battery swapping position refers to a position suitable for battery removal from the electric vehicle parked on the vehicle carrying platform;

the second predetermined waiting position refers to a position within a second distance threshold from the predetermined battery swapping position when the predetermined battery swapping position is in parking non-available condition, which the predetermined battery swapping position refers to a position suitable for battery removal from the electric vehicle parked on the vehicle carrying platform;

the control unit is further configured to send a fine-tuning instruction to the battery swapping device for battery removal after the electric vehicle is parked on the vehicle carrying platform, which the fine-tuning instruction is configured to command the battery swapping device for battery removal to move to the predetermined battery swapping position from the second predetermined waiting position;

the predetermined battery swapping position is in parking available condition as all the following conditions are satisfied, otherwise, the predetermined battery swapping position is in parking non-available condition:

the predetermined battery swapping position is an empty space;

existing an access for the battery swapping device for battery removal to move to the predetermined battery swapping position;

it is predicted that the battery swapping device for battery removal does not obstruct an electric vehicle moving to the vehicle carrying platform when the battery swapping device for battery removal is parked in the predetermined battery swapping position.

16. The battery swapping control system of claim 15, wherein the control unit is further configured to monitor the level of batteries placed on the battery placing racks;

the first condition is set to have a fully charged battery with the battery model;

or, the first condition is preferably set to have a fully charged battery with the battery model, and if none of the at least one battery placing rack meet the first condition, the first condition is modified to be having a battery of the battery model with the highest power.

17. The battery swapping control system of claim 16, wherein the control unit is further configured to select one battery placing rack randomly as the first placing rack from battery placing racks that meet the first condition when more than one battery placing rack meets the first condition, or select the battery placing rack closest to the electric vehicle or the battery placing rack closest to a vehicle carrying platform for parking the electric vehicle as the first battery placing rack;

and/or, the control unit is further configured to select a battery placing rack randomly as the second placing rack from battery placing racks that meet the second condition when more than one battery placing rack meets the second condition, or select one battery placing rack proximate to the electric vehicle or the vehicle carrying platform as the second battery placing rack.

\* \* \* \* \*